(12) United States Patent
Benedict

(10) Patent No.: US 7,101,139 B1
(45) Date of Patent: Sep. 5, 2006

(54) AUTOMATED MATERIAL HANDLING SYSTEM WITH MOTORIZED TRANSFER VEHICLES

(76) Inventor: Charles E. Benedict, 3207 Remington Run, Tallahassee, FL (US) 32312

( * ) Notice: Subject to any disclaimer, the term of this patent is extended or adjusted under 35 U.S.C. 154(b) by 9 days.

(21) Appl. No.: 10/429,784

(22) Filed: May 6, 2003

(51) Int. Cl.
*B65G 1/00* (2006.01)
*B66B 9/00* (2006.01)
*B62D 57/00* (2006.01)

(52) U.S. Cl. ............... 414/281; 414/660; 187/249; 180/6.48; 180/7.1; 180/168

(58) Field of Classification Search ............. 414/332, 414/467, 909, 281, 660; 901/1, 48, 50; 180/7.1, 180/6.48, 6.5, 168; 187/249; 191/2, 22 R; 104/88.01, 88.02
See application file for complete search history.

(56) References Cited

U.S. PATENT DOCUMENTS

| | | | | |
|---|---|---|---|---|
| 2,612,238 A * | 9/1952 | Angelicola | ............ | 187/270 |
| 3,743,116 A * | 7/1973 | Giessler et al. | ........... | 414/279 |
| 4,279,563 A * | 7/1981 | Miller | ............ | 414/611 |
| 4,612,996 A * | 9/1986 | Wolf et al. | ........... | 172/26 |
| 4,637,494 A * | 1/1987 | Iida et al. | ........... | 104/288 |
| 4,641,757 A * | 2/1987 | Rosendale | ........... | 212/312 |
| 4,764,078 A * | 8/1988 | Neri | ............ | 414/273 |
| 4,865,155 A * | 9/1989 | Montaigne et al. | ....... | 182/14 |
| 5,395,199 A * | 3/1995 | Day et al. | ........... | 414/267 |
| 5,433,293 A * | 7/1995 | Sager | ............ | 187/249 |
| 5,453,931 A * | 9/1995 | Watts, Jr. | ........... | 701/23 |
| 5,464,082 A * | 11/1995 | Young | ........... | 191/2 |
| 6,049,745 A * | 4/2000 | Douglas et al. | ......... | 701/23 |
| 6,393,335 B1* | 5/2002 | Ostwald | ........... | 700/214 |
| 6,668,950 B1* | 12/2003 | Park | ............ | 180/7.1 |

* cited by examiner

*Primary Examiner*—Eileen D. Lillis
*Assistant Examiner*—Michael Lowe
(74) *Attorney, Agent, or Firm*—Dowell & Dowell, P.C.

(57) ABSTRACT

A material handling system for use in storing and moving goods within multi-level storage warehouses, ocean going vessels and the like wherein storage areas are provided on at least one of the levels and wherein goods are automatically transferred to and from the storage areas and between the various levels by self-propelled load transfer vehicles. The load transfer vehicles move across the surface of the various levels and deliver are also movable within open vertical trunks between the levels to thereby move goods to any desired area.

39 Claims, 12 Drawing Sheets

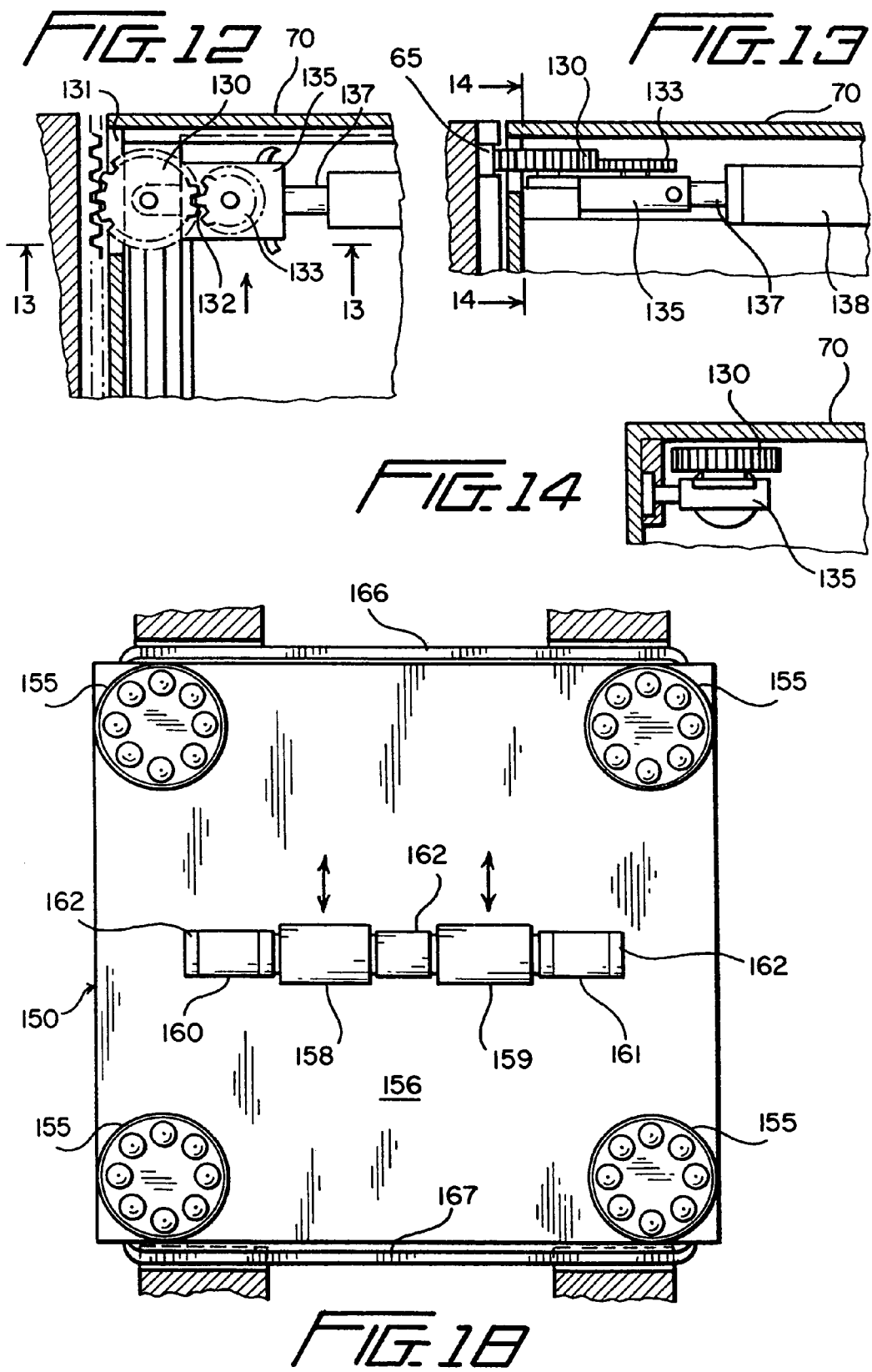

AUTOMATED MATERIAL HANDLING SYSTEM WITH MOTORIZED TRANSFER VEHICLES

BACKGROUND OF INVENTION

1. Field of the Invention

The present invention is directed to automated material and article handling systems which can be used in any multi-level warehouse storage and/or distribution environment, including ocean going vessels, such as naval ships. Each storage system includes a plurality of vertically spaced goods receiving and storage levels, such as below deck storage areas, in which goods or cargo may be selectively stored in vertically and horizontally spaced bins. In preferred embodiments, the goods are carried on pallets which are moved by powered load transfer units or vehicles which can traverse areas of the multiple levels and which also can travel upwardly or downwardly relative to the levels or decks within vertically open trunks. In this manner, goods may be delivered to and from the storage areas at one or more levels or decks and distributed automatically therefrom to selected areas.

2. Brief Description of the Related Art

In material and article handling systems conventionally used in warehouse and distribution centers, as well as on ocean going vessels, various goods including supplies, spare parts, dry goods, general merchandise and the like are normally loaded into the storage areas of the facility or vessel utilizing forklifts, gantry type elevators, special cranes, hoists and the like which raise and lower the goods between various levels or decks. In such systems, it is also necessary to provide load transferring devices, such as special trucks or fork lifts, at each of the levels to move goods relative to elevators or hold areas where the goods are initially off-loaded utilizing the above referenced loading equipment. In such systems, when goods are needed from storage, the same equipment which is utilized for initially storing the goods is used to retrieve the goods. In some storage environments, such as on ships, goods from storage must often be moved between various levels or decks thus requiring not only equipment to be available in the area of storage bins, but also requiring similar equipment at each deck level where the goods are to be distributed. Further, elevators are required between the levels or decks.

The above conventional material handling systems are very labor intensive and costly to maintain. In facilities having multiple storage floors and on ocean going vessels having multiple decks, the use of multiple load carrying vehicles or machinery at different levels increases not only the number of workers or crew members necessary to effectively distribute goods but also requires duplication of equipment at each level for maneuvering large, heavy and bulky items.

In view of the foregoing, there is a need to provide for an enhancement in the handling and storage of goods in multi-level storage, warehouses and distribution environments and especially in environments such as ocean going vessels. Material and article handling systems are needed which will reduce the number of workers or crew members which must be dedicated to the movement and storage of goods and which also will reduce the number of load carrying and maneuvering vehicles and other equipment which is necessary in conventional material handling and storage systems.

SUMMARY OF INVENTION

The present invention is directed to automated material and article handling systems for use in multi-level warehouses, distribution centers and/or storage areas and which systems are particularly adapted for use on ocean going vessels, including military ships. The material and article handling systems include load or article transfer units or vehicles which are powered and moveable both along floor or deck areas, such as within a hold storage area of a ship, and which are also independently vertically moveable between levels or decks. The vehicles are designed to move within special open vertical shafts or trunks so that goods can be transported to vertically spaced areas without requiring separate loading and unloading equipment on each level or deck, as is the case with conventional material and article handling systems.

With the present invention, the load transfer units or vehicles have first drive members which allow generally universal or omni-directional movement of the vehicles across horizontal levels, such as floors and decks, such that the vehicles may be maneuvered relative to storage bins which are provided in horizontally and vertically spaced arrangements within storage areas. In some embodiments, the transfer vehicles may be self-loading and/or off-loading so that goods may be placed into or removed from storage bins without worker or crew member effort. Further, motors or drive mechanisms associated with the first drive members for providing propulsion across horizontal surfaces may be manually or remotely controlled or subject to on-board programmable controllers associated with each vehicle.

In some embodiments of the invention, the omni-directional movement of vehicles is obtained by providing drive rollers, wheels or tracks in spaced relationship beneath the vehicles which are separately powered such that they may be driven in opposite relationship with respect to one another to create a turning effect so that the vehicles may be maneuvered in a 360° manner relative to the surface over which they travel.

In other embodiments, the vehicles may be mounted about a center support so that a load carrying platform associated with each vehicle may be rotated substantially 360°. In some embodiments, the load carrying vehicles may be supported on special carriage members which include rollers supported in tracks above or below a floor or deck surface. The tracks provide a positive guide for the vehicles when moving potentially hazardous goods or cargo. By guiding the vehicles in a track system, it is possible to ensure that the load carrying vehicles are positively guided at all times when in a storage area regardless of any change in pitch or roll of a ship at sea.

In some systems, guide wires or other devices may be placed within floor or deck areas for providing a guidance system for controlling movement of the vehicles. In other systems, Global Positioning System (GPS) controls may be associated with each vehicle to provide guidance for movement of the vehicles both horizontally and vertically relative to the multiple levels or decks associated with a system.

The load transfer vehicles may also be remotely controlled so as to allow information to be provided to on-board control units associated therewith. Information will be provided to direct a vehicle to and from loading and storage areas including information to where goods are to be loaded or delivered, thereby completely freeing each load transfer vehicle from worker or crew member input at a point of loading, during transport to storage or during distribution from storage. Input systems may also be used such as bar codes, RF tagging systems and other readers which scan labels or tags on goods being initially loaded onto a transfer unit or vehicle for conveying to storage. Preprogramming of the units can provide guidance to each transfer vehicle with respect to the movement or destination of specific goods loaded thereon based upon information received from scanning of the goods when loaded and/or from a central computer system which is in communication with each transfer vehicle.

The self-propelled load transfer vehicles are also provided with second drive members which are engageable with racks or similar elements which are mounted so as to extend vertically between floors or deck levels of a warehouse or ship. The vehicles may be maneuvered into special racks, open shafts or trunks and thereafter operated to move vertically without the need for lifting machinery such as cables, hoists, or pneumatic or hydraulic lifts. In one preferred embodiment of the present invention, each of the load transfer vehicles is vertically movable by oppositely oriented and elongated drive pinion rotors or drums which include a plurality of cog elements or teeth. The rotors are powered by one or more drive motors which are drivingly connected to each of the rotors so that they are rotated simultaneously at the same speed but in opposite directions relative to one another. When driven, the teeth of each drive rotor are engageable between spaced teeth of the racks provided on opposite sides of each of the electrical racks, open shafts or trunks.

To permit the vehicles to be elevated above an upper floor or deck of a system, upper sections of each of the racks may be extended upon the opening of doors which normally cover the uppermost end of each of the trunks. As a load transfer vehicle approaches a predetermined elevation within a trunk, the doors are opened either by engagement with the vehicles or by sensors operatively connected to mechanisms to open and close the covering doors. With the doors raised, the upper rack sections allow the load transfer vehicles to be raised so as to be self-loading or off-loading relative to the upper floor or deck surface. Upon lowering of the transfer vehicles within one of the trunks, the doors are closed automatically so as to be substantially flush with the surface of the upper floor or deck.

Each transfer unit or vehicle also includes third drive members for use in moving the vehicles into and from the trunks from the various floors or levels through access openings provided at each level. Adjacent each access opening are horizontal racks having spaced teeth which cooperate with horizontal pinion drives associated with the third drive members. The pinion drives are operable on opposite sides of the transfer vehicles to intermesh with the horizontal racks to either pull a vehicle into a trunk or discharge a vehicle from a trunk. The pinion drives are driven by power sources such as motors such that the pinion drives on opposite sides of the vehicle are rotated at a uniform velocity but in opposite directions. In preferred embodiments, the pinion drives are extendible relative to the transfer vehicles so as to be normally housed within the vehicles but being selectively deployed when needed to move a vehicle into or from a trunk.

The vertical and horizontal racks of the open shafts or trunks and the drive rotors and pinion drives can be replaced by other cooperatively functioning mechanisms in order to permit the transfer vehicles to move either in and out of or vertically along the trunks. By way of example, cog wheels or gears could replace the rotors and pinion drives. Such gears may have teeth which are engageable within openings of special tracks which would extend both horizontally and vertically within the open shafts or trunks to replace the racks discussed above.

Each of the load transfer vehicles of the present invention, because of their need to move vertically in both ascending and descending manners, includes appropriate braking devices for slowing and/or preventing further movement within the vertical trunks. Various types of braking mechanisms may be used either as separate mechanical devices or anti-backdrive gears may be associated with drive motors of the transfer units which prevent any non-desired movement of the motor drive shafts. Automatic brakes may be provided to prevent movement of the vehicles in the event of loss of motive power when the vehicles are traveling with the vertical trunks, even when carrying substantially heavy loads.

In accordance with some of the preferred embodiments of the present invention, the self-propelled transfer vehicles receives operating power for operating motors, drive systems and control elements associated therewith either by special electrical raceways along which the vehicles travel or on-board batteries. Appropriate connections are provided with each vehicle to allow electrical charging of batteries when the vehicles are not in use. In addition, the second drive members may be connected to an on-board generator which may be provided within each vehicle. The generators are connected so as to charge the on-board batteries as the transfer vehicles descend within the trunks. In this manner, the batteries or other sources provide power to operate the motors and systems associated with each vehicle when the vehicles are moving in an ascending manner within the trunks and the batteries are charged by the on-board generators when the vehicles move in a descending manner within the trunks.

In addition to the provision of various rack or track elements associated with the trunks of the invention, the storage bins within the various levels or decks of a system may also include racks or tracks which extend vertically between the storage bins such that each transfer vehicle may also be elevatable with respect to a series of vertically spaced storage bins. In such systems, the spacing of the bins in rows is such as to allow the pinion rotors to engage bins on opposite side of an aisle to permit vertical movement of the vehicles relative to the storage bins.

In other embodiments of the present invention, one or more of the load transfer vehicles may incorporate elevating, loading or discharge mechanisms which are mounted thereto for purposes of moving goods carried by the vehicles to or from storage bins. Such handling equipment may include forklift type elements which are movably mounted with respect to the transfer vehicles both horizontally and vertically. To provide for stability, when such load handling equipment is mounted to one of the transfer vehicles, appropriate outriggers or other stabilizing elements are provided which may be deployed outwardly relative to the vehicles so as to offset any force created that would otherwise tend to tip one of the vehicles. In some environments, such as on ships having metallic flooring, such stabilizing devices may include electro-magnetic devices carried by the outriggers or clamping devices that engage channels or tracks in the deck.

It is the primary object of the present invention to provide an automated material and article handling system which can be used effectively in any type of warehousing, storage, distribution and/or cargo storage system which incorporates a plurality of vertically spaced levels and wherein goods are stored on designated levels and distributed to other levels and which is uniquely adaptable to warehouses and ocean going vessels, including naval ships, for storage and distribution of goods in such a manner as to reduce required aisle space for the equipment and manual involvement and duplication of equipment when compared to conventional storage and handling systems.

It is a further object of the present invention to provide automated material and article handling systems wherein self-propelled load transfer vehicles are used to transport, store, retrieve and distribute goods relative to a storage area wherein the vehicles are movable both across horizontal surfaces as well as within vertical trunks between levels with the vehicles ascending and descending under their own power.

It is yet another object of the present invention to provide automated material and article handling systems which are particularly adapted for warehouses and ocean going vessels wherein increased safety is achieved by providing systems which allow for self-loading of transfer vehicles from cargo or storage areas and subsequent movement of goods to desired locations without manual intervention, other than through manual remote control of the transfer units.

It is also an object of the present invention to provide automated material and article handling systems wherein movement of load transferring vehicles is guided either by providing positive guide tracks which control movement of the vehicles or by providing other types of electronic and remote control including electronic guide wires, lasers or GPS positioning systems so that vehicles can be controlled in their movement from point-to-point, and horizontally and vertically, within a system where goods are stored and distributed.

It is yet another object of the present invention to provide electrically powered load transfer vehicles for use in automated article handling and storage systems wherein the vehicles are powered via electrical raceways or batteries and wherein, the vehicles may include generators for charging on-board batteries when the transfer vehicles move in vertically descending relationship with respect to a plurality of levels of the system such that movement of the vehicles during normal use provides energy for charging of the on-board batteries.

BRIEF DESCRIPTION OF THE DRAWINGS

A better understanding of the invention will be had with respect to the attached drawings wherein:

FIG. 6 is a top plan view of the doors covering one of the trunks of the invention;

FIG. 12 is a partial cross-sectional view taken along line 12—12 of FIG. 11;

FIG. 13 is a partial cross-sectional view taken along line 13—13 of FIG. 12;

FIG. 14 is a partial cross-sectional view taken along line 14—14 of FIG. 13;

FIG. 18 is a bottom plan view of the embodiment shown in FIGS. 16 and 17;

DESCRIPTION OF THE PREFERRED EMBODIMENTS

As previously noted, the present invention is directed to article handling, storage and distribution systems which are generally fully automated. The systems may be used in substantially any multi-level warehouse, distribution or storage environment including multi-level environments on ocean going vessels. The drawings and description will be described with respect to systems which are shown for use in ocean going vessels, however, the invention is not limited to this environment.

Figure 1:
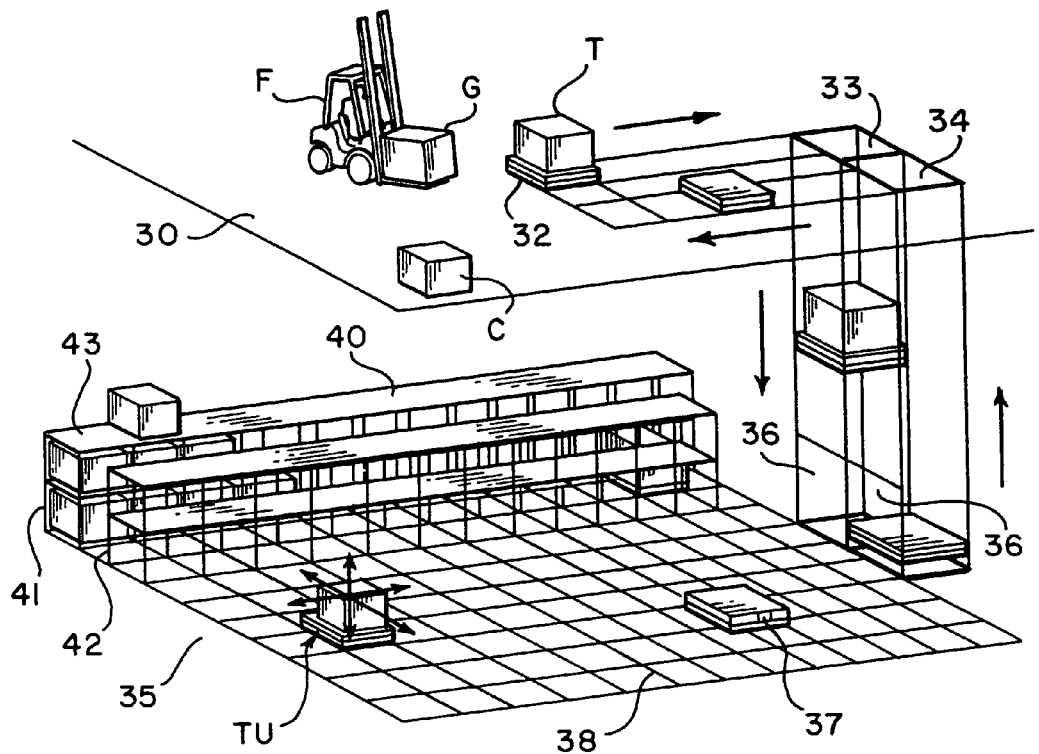
FIG. 1 is schematic illustrational view of an automated material handling and storage system in accordance with the teachings of the invention.

With specific reference to FIG. 1, a conceptional illustrational view is disclosed of the basics of the system. The system may be used where goods are to be handled and transported between receiving levels or decks and storage levels or decks and the number of levels may vary from two or more. For simplicity of illustration, in FIG. 1, only two levels are shown. The upper level 30 is a receiving level or deck on which various goods "G" on pallets are received. The goods are maneuvered by conventional vehicles such as forklifts "F" and placed on powered transfer units or vehicles 32 of the invention. The transfer vehicles are movable along all levels and, in this respect, will be described with the different driving and guidance elements for controlling movement of the transfer vehicles across the various levels or decks of the system. The transfer vehicles are also moveable with respect to generally open vertically extending trunks 33 and 34 which are normally covered, as will be described in greater detail hereinafter, but which are opened to receive the transfer vehicles 32 and to permit the transfer vehicles to exit therefrom.

As illustrated, once goods are placed on a transfer vehicle 32, the vehicle is activated to move toward the down trunk 33. The manner in which the vehicles enter the trunk will be described hereinafter. The vehicles are uniquely constructed so as to allow them to ascend or descend within the trunk 33 under their own power or power received by electrical raceways and with their own braking means.

The transfer vehicles are movable between multiple levels although only a single lower storage level 35 is shown in FIG. 1. As a loaded transfer vehicle approaches the storage level or deck 35, the unit will egress from an opening 36 in the trunk onto the deck surface 35. As illustrated in FIG. 1, in some embodiments, the transfer vehicles may track in an open channel grid system provided along the surface of the level 35, as illustrated at 38 in the drawings. Further description of the manner in which the vehicles may track along the grid system is set forth hereinafter.

As shown in FIG. 1, a plurality of horizontally and vertically spaced storage bins 40 are provided within the storage area for receiving the goods carried by the transfer vehicles. The spacing between adjacent rows, such as shown at 41 and 42, is such as to permit the transfer vehicles to pass therebetween and in such a manner that, in preferred embodiments, the transfer vehicles will also be able to be elevated by inter-engaging with special tracks or racks provided along the face of each bin as generally illustrated at 43. The tracks or racks 43 provided along the vertical faces of each side of the bins will be identical to those which will be described for use on opposite sides of the trunks 33 and 34, which also permit the inter-engagement of driving mechanisms associated with each transfer vehicle to control vertical movement.

When goods are needed from storage or when a transfer vehicle is needed on the upper level receiving area 30, the transfer vehicle 32 enters into the ascending trunk 34, as is illustrated in the drawing figures, and thereafter elevates itself until it reaches the upper deck or level 30. Thereafter, the unit moves under its own power to a point to be loaded with goods, as is illustrated in the drawing figure.

As opposed to the open channels for providing guidance as shown in FIG. 1, the transfer vehicles of the present invention may function as automatic guidance vehicles (AGV) and may be guided by electrical wires placed along the surface of the levels 30 and 35. As opposed to utilizing AGV technology, it is also possible to use GPS positioning technology to control the movement of the vehicles from point-to-point along the surface of any of the levels and within the trunks 33 and 34.

The transfer vehicles may also be in communication with a central computer "C" which tracks the movement of the vehicles and goods within the storage and distribution system such as by use of on-board transponders and the like 37. In this respect, and by way of example, goods "G" being received may include indicia such as bar codes or RF tags "T" which allow the goods to be identified. This information is received by the transfer vehicles which communicates the information to the central computer. The central computer thereafter determines where the goods are to be placed within one or more specific storage areas of the system, including the specific bin. This information is thereafter provided to the transfer vehicles such that the vehicles are automatically guided to the appropriate storage bin in the appropriate storage area for purposes of transferring the goods to the correct storage bins.

In a like manner, when certain goods are required throughout the distribution system, information from the central computer can be transmitted to receivers placed on the transfer vehicles. Such information may direct that specific goods be taken from specific storage bins and transferred to a specific location at a different or same level of the storage and distribution system.

Although not shown in FIG. 1, the transfer units may also include transfer or receiving means for automatically discharging or loading goods "G" to and from the bins 40 so that no additional equipment for handling or maneuvering goods is necessary within a storage area, other than the transfer vehicles. Example of such transfer vehicles will be described in greater detail hereinafter.

As previously noted, the material handling and storage system of the present invention is uniquely designed to allow for the automated receipt, storage and distribution of goods on a plurality spaced levels of a system using the transfer vehicles 32 to maneuver both along the vertically spaced levels as well as in the trunks 33 and 34 which extend between the levels. Although only two trunks are shown in FIG. 1, any number of trunks may be used in a system.

Figure 2:
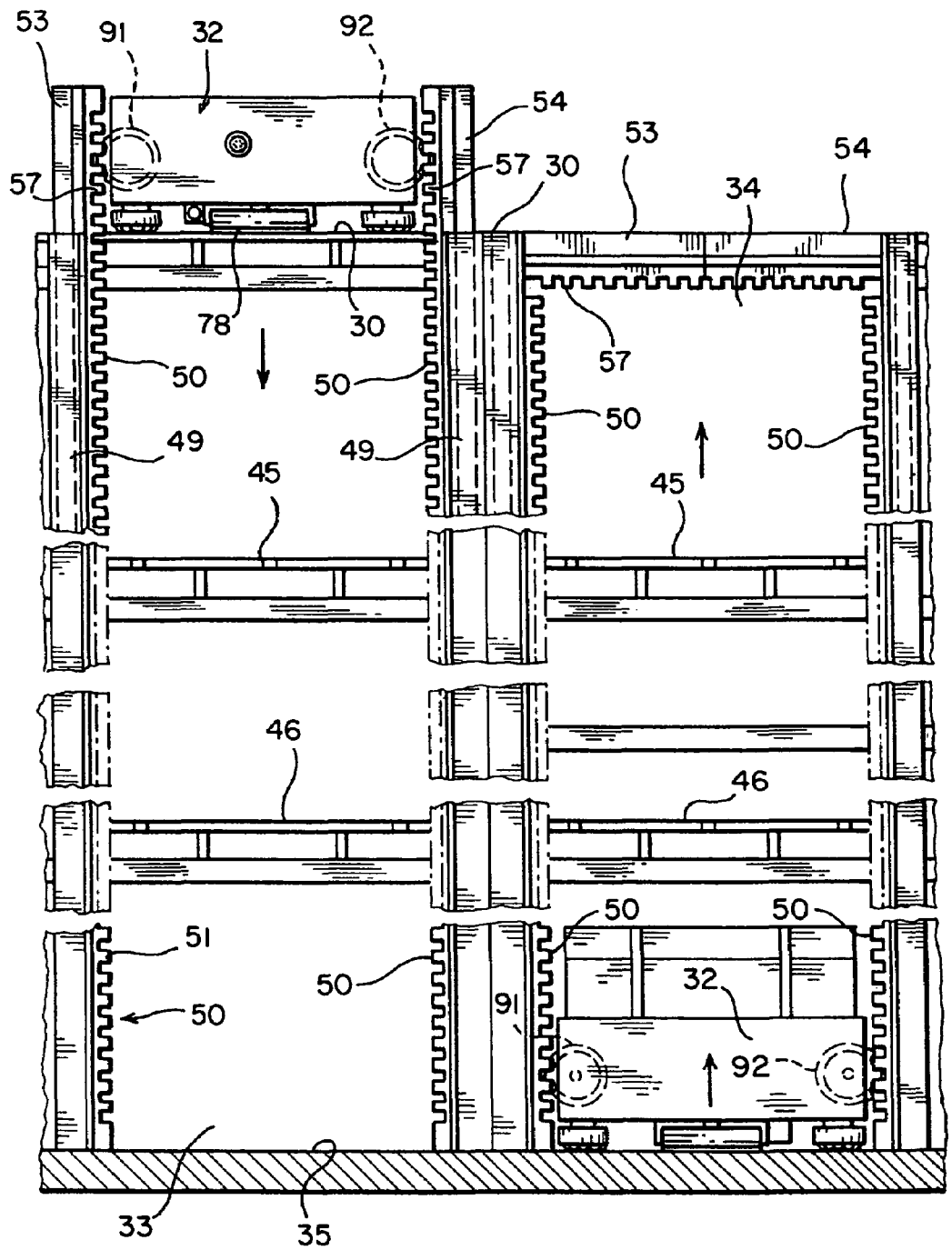
FIG. 2 is a cross-sectional view of a pair of vertical trunks through which load transfer vehicles are movable in accordance with the teachings of the invention.

With respect to FIG. 2, the upper deck or level 30 is shown as being spaced by a plurality of levels or decks 45 and 46 with respect to the lower storage deck 35. Frequently, ten or more deck or levels may be associated with a given system and the number is not limited within the teachings of the invention. In order to allow the transfer vehicles 32 to move vertically through each of the open trunks, it is necessary to provide mechanical engaging elements which extend along the full height of each trunk on the opposite sidewalls thereof. As opposed to being mounted across the full width of the sidewalls, mechanical engaging elements may be rigidly secured to reinforcing steel frame members, such as shown at 49 in FIG. 2, which extend along opposite corners of each sidewall of the trunks. In the embodiment shown in FIG. 2, the mechanical inter-engaging elements are shown as racks 50 having a plurality of vertically spaced teeth 51. The configuration of the teeth 51 and the spacing therebetween is such as to cooperatively receive intermeshing teeth associated with vertical drive elements associated with each of the transfer vehicles 32, as will be described hereinafter. With specific references to FIGS. 4 and 5, in one preferred embodiment, two separate and spaced vertically extending racks 50A and 50B are provided on each side of each trunk, again, however, the racks 50 may extend completely across the width of the sides of the trunk.

As opposed to the rack configuration previously described and shown in the drawing figures, other mechanical inter-engaging elements may be used. By way of example, elongated vertical tracks having a plurality of equally spaced openings may be used to receive cog elements or teeth associated with drive gears or cog wheels used as drive elements for moving the transfer vehicles vertically through the trunks.

When the trunks 33 and 34 are not in use, it is important to ensure that the upper openings into the trunks are secured such that the upper floor, deck or level 30 can be used in a conventional manner. With respect to FIG. 6, a top plan view of a closure member 52 is shown which seals the upper opening into each trunk 33 and 34. It is contemplated that the closure member extends flush with the adjacent surface of the upper deck level or surface 30 when closed.

In the embodiment shown in the drawing figures, each closure member 52 is formed of two separately pivotable doors 53 and 54 which are mounted below the level 30 to pivots 55 and 56, respectively.

Figure 3:
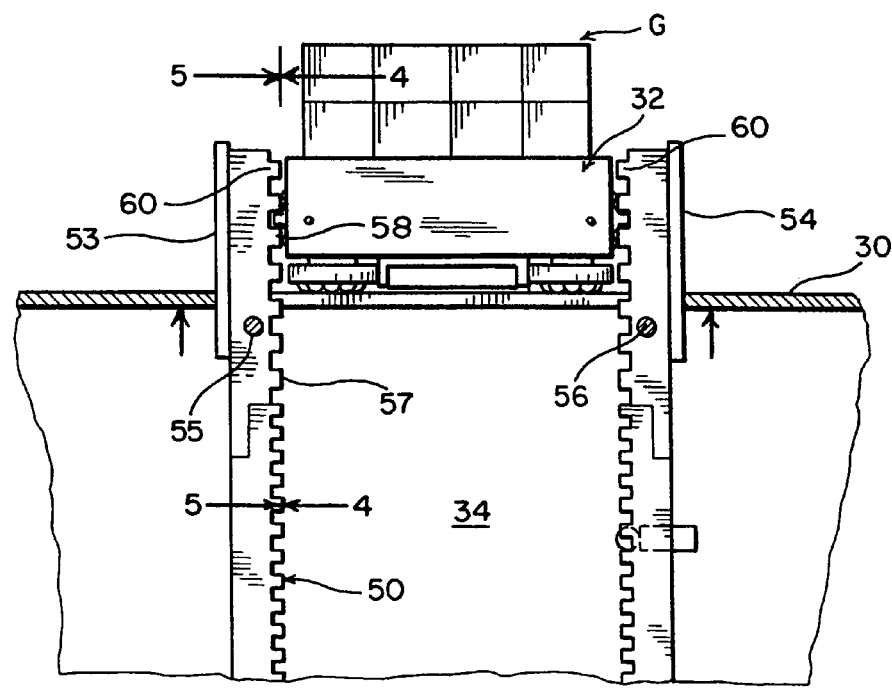
FIG. 3 is a view of an upper portion of one of the trunks of the present invention illustrating the manner in which one of the load transfer vehicles enters or exits the open trunk.
Figures 4, 5:
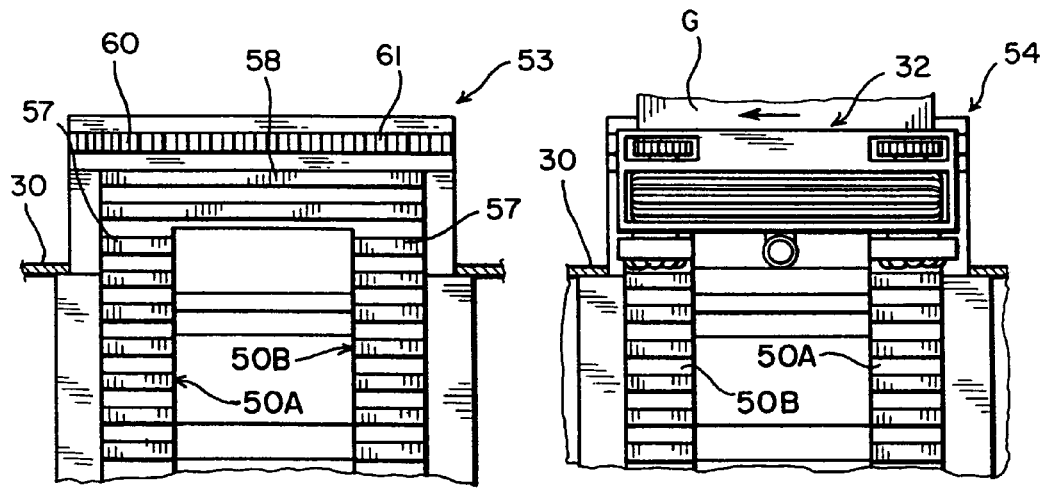
FIG. 4 is a view taken along line 4—4 of FIG. 3 showing the vertical rack arrangement for the open trunks and for the doors for closing the trunks.
FIG. 5 is a view taken along line 5—5 of the FIG. 3 showing one of the load transfer vehicles in a position to either enter or exit an open trunk.
Figure 8:
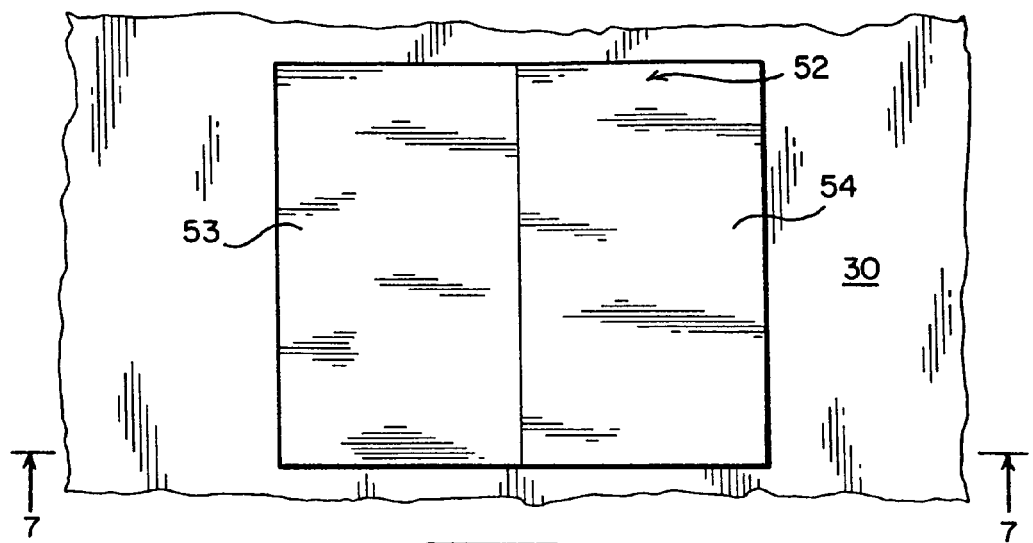
Figure 7:
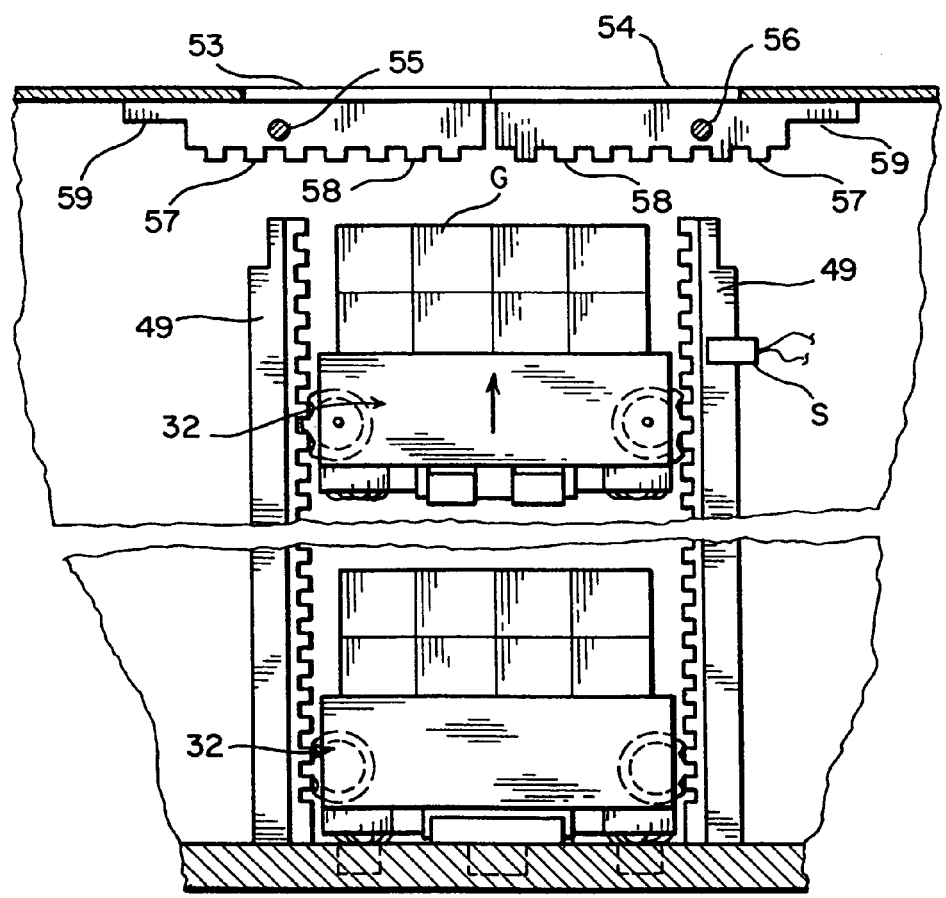
FIG. 7 is an illustrational view taken along line 7—7 of FIG. 6 showing a door closed as one of the load transfer vehicles of the invention approaches the door.

As one of the transfer vehicles 32 is being elevated relative to the closed doors 53 and 54, as shown in FIG. 7, the doors are designed to automatically pivot to an open position as shown in FIGS. 3 and 5 to permit the vehicles to be elevated to the surface of the upper level 30 so that the vehicles can be maneuvered across the level 30. As shown in the drawing figures, the doors are designed to be pivotally opened either automatically by a sensor control operating mechanism or directly by impact of goods carried by one of the transfer vehicles 32 or by contact of one of the vehicles with the under surface of each of the doors.

As a transfer vehicle continues to vertically ascend, the doors are forced to a vertically upright position as shown in FIG. 3 wherein outrigger portions 59 of each door engage and abut the reinforcing frame members 49 on opposite sides of the trunk. Each of the doors 53 and 54 is also provided with a secondary rack 57 along the lower surface thereof which aligns with the racks 50A and 50B extending vertically on the opposite sidewalls of each of the trunks, as is shown in FIG. 4. In this manner, the racks 57 form a continuation of the rack system within each of the trunks which extends the rack system above the surface of the upper level 30. In this manner, the vehicles elevate to the surface of the upper level 30 as the doors are opened. Further, the weight of each transfer vehicle which would tend to force the doors 53 and 54 away from one another is offset by the engagement of the outrigger portions 59 of each door with the reinforcing structural elements 49 of the trunk.

As opposed to allowing the doors 53 and 54 to be pivoted by contact, a separate sensor "S" may be mounted along one of the racks to sense the approach of the transfer vehicle. The sensor may be electrically connected to appropriate drive motors for powering the doors 53 and 54 from the closed position shown in FIG. 7 to the fully open positioned shown in FIG. 3 prior to the transfer vehicle engaging either of the doors 53 or 54.

As shown in FIG. 4, some of the teeth 58 associated with each of the secondary racks 57 may be formed continuously across a substantial width of each door to provide further support for the transfer vehicles as they elevate from the upper opening of each trunk 33 and 34.

With further reference to FIG. 4, a horizontal rack 60 is provided along the full width of each door 53 and 54. The rack 60 includes a plurality of generally equally spaced teeth 61. The shape or configuration of the teeth 61 and the spacing therebetween is such as to cooperatively allow the intermeshing of third drive elements associated with each of the transfer vehicles. The third drive elements will cause the transfer vehicle to be propelled laterally with respect to the doors when they are in the open position shown in FIGS. 3–5, thus propelling the vehicles onto the upper surface of the level 30.

As noted with respect to the horizontal rack 60 of FIG. 4, it is also necessary to provide horizontal racks at each access opening 36 associated with each of the trunks 33 and 34 for purposes of allowing each of the transfer vehicles to propel itself both into, and outwardly of, the trunks. In this respect, FIG. 8 discloses a section of the vertical and horizontal rack system associated with each of the opposite sidewalls of each trunk 33 and 34. As previously disclosed, the vertical racks 50A and 50B extend the full height of each of the trunks. However, at each access opening 36 into the trunk from the various levels or decks, there are horizontal racks 65 which extend between the vertical racks 50A and 50B. The racks 65 are formed of a plurality of spaced teeth 66 which are shaped and configured to allow intermeshing of the third drive elements associated with each of the transfer vehicles as previously discussed.

To provide an intersection for the various drive elements of the invention, a plurality of rack teeth 68 are provided at the intersection areas of each vertical rack 50A and 50B with a horizontal rack 65 as is shown in the drawing figure. The spaced teeth 68 function not only to provide the necessary meshing surfaces for a second drive element meshing with the vertically spaced teeth of the vertical racks 50A and 50B but also permits a horizontal meshing of teeth associated with the third drive element of each transfer vehicle moving horizontally relative to rack 65.

Figure 8:
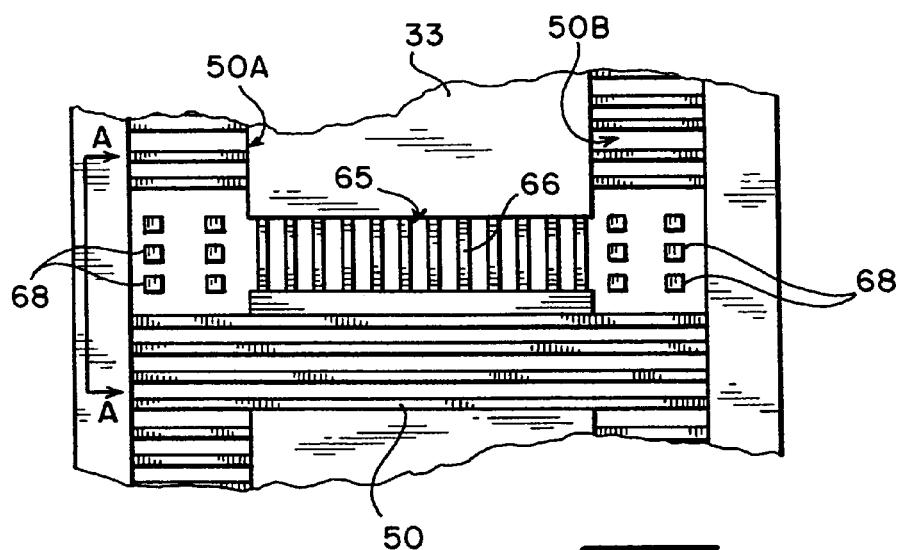
FIG. 8 is a partial front elevational view of the rack systems used in the open trunks of the present invention to support the load transfer vehicles therein.

In a preferred embodiment of the invention, and also as shown in FIG. 8, provision is made for extending the vertical rack 50 across the full width of the side of each trunk at an area spaced below the horizontal rack 65. The connection of the separate rack segments 50A and 50B provides support surfaces for the vertical drive elements associated with each transfer vehicle which elements will slide within the intermeshing teeth and thereby support the transfer vehicles as they are being moved horizontally inwardly and outwardly relative to the trunks 33 and 34. The arrows A—A shown in FIG. 8 indicates the general approach of a transfer vehicle relative to the rack elements associated with the invention at each of the various levels wherein access is available to one of the trunks 33 or 34.

The trunks which extend through the various levels, when used on a ship, must only be anchored generally at each of the deck levels so as to be somewhat yieldable with the deck components of the ship. Thus, the racks are somewhat flexible to account for forces imparted on the structural elements of the ship during high seas when a great deal of force is placed on the structural elements requiring that they flex.

With specific reference to FIGS. 9–15, a first embodiment of load transfer vehicle 32 is disclosed in greater detail. In this embodiment, the vehicle includes a body defined by generally planar upper support surface 70, lower surface 71, front and rear ends 72 and 73 and opposite sidewalls 74 and 75. The body is generally supported adjacent the corners thereof by heavy duty roller sets 76 in which a plurality of heavy roller bearings are housed. As opposed to supporting the vehicle only at its corners, additional roller sets may be provided depending upon the anticipated weight to be carried by the vehicle.

The transfer vehicle 32 is maneuvered horizontally across the various level or deck surfaces by a propelling roller or wheel 78 which is pivotally mounted generally centered with respect to the lower surface 71 by a mounting yoke 79. An electric motor or other drive device 80 is drivingly engaged with the wheel to provide motive power both in forward and reverse directions, as is necessary. The motor is generally supported by the yoke to which the wheel is mounted so that the motor may be rotated simultaneously with the pivoting movement of the wheel as it is maneuvered in order to change direction of the vehicle. The specific mounting arrangement for the drive roller 78 is such that an omni-directional movement of the vehicle relative to any horizontal surface is possible. The surface of the roller may be textured in order to provide greater frictional contact between the roller and the surface over which the vehicle passes.

The motor 80 is electrically connected through an on-board programmable controller 81 to a source of electrical power, such as an on-board rechargeable battery 82 mounted interiorly of the vehicle or other source such as an electrical raceway. Steering of the drive roller is accomplished by operation of a steering motor 84 mounted within the vehicle and which drives a worm gear 85 which meshes with a steering gear 86 connected to the yoke 79 to which the roller 78 is mounted. Drive motor 84 may be driven in either direction depending upon input from the controller 81.

The controller 81 is connected to the transponder 37 and allows the vehicle 23 to be operated such as an automated guided vehicle (AGV), that can track and record X, Y and Z coordinates of its movement at all times. Further, in some embodiments, the controller 81 of each of the vehicles may be in communication with other vehicles operating within a system to ensure that the vehicles do not interfere with one another during movement across the various levels or decks and through the various trunks. GPS systems may be incorporated within the controller 81 in order to provide exact location coordinates for the vehicles at all times which coordinates are monitored during use of each vehicle. Control can be provided by the control computer "C" located within the system.

As previously described, when a vehicle receives goods to be stored, such as illustrated in FIG. 1 along the upper level 30, the transponder 37 may include an RF transponder for reading RF tags associated with the goods. In this manner, the controller can communicate with the central computer and the computer can advise the controller of the exact location or storage bin in which the goods are to be stored. As opposed to using RF tags, other types of electronic identification systems may be used such as bar code labels and the like.

With respect to the horizontal drive system incorporating the drive roller 78, various types of braking mechanisms may be used to prevent motion of the vehicle, especially if the system is being used within an ocean going vessel. One type of braking system could be the use of an anti-backdrive gear for the worm gear 85. An anti-backdrive gear prevents any force from rotating the motor drive shaft other than the motor itself, thus functioning as an effective braking mechanism.

Figure 9:
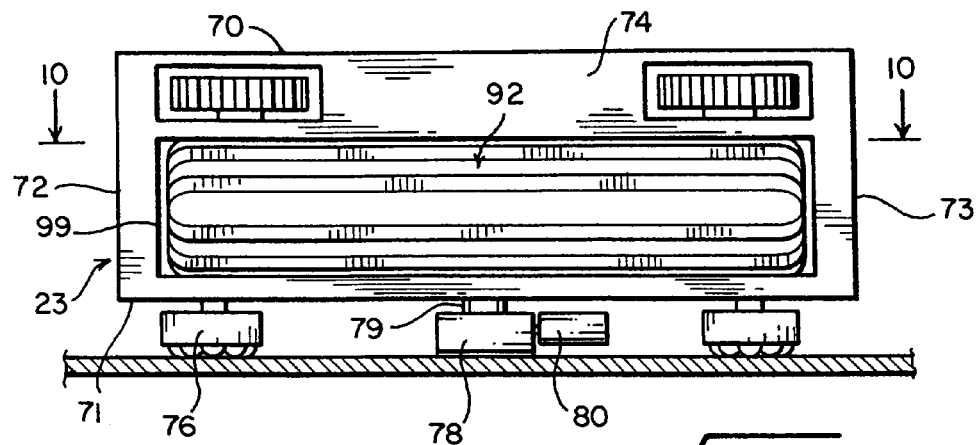
FIG. 9 is a side elevational view of a first embodiment of load transfer vehicle in accordance with the present invention.
Figure 10:
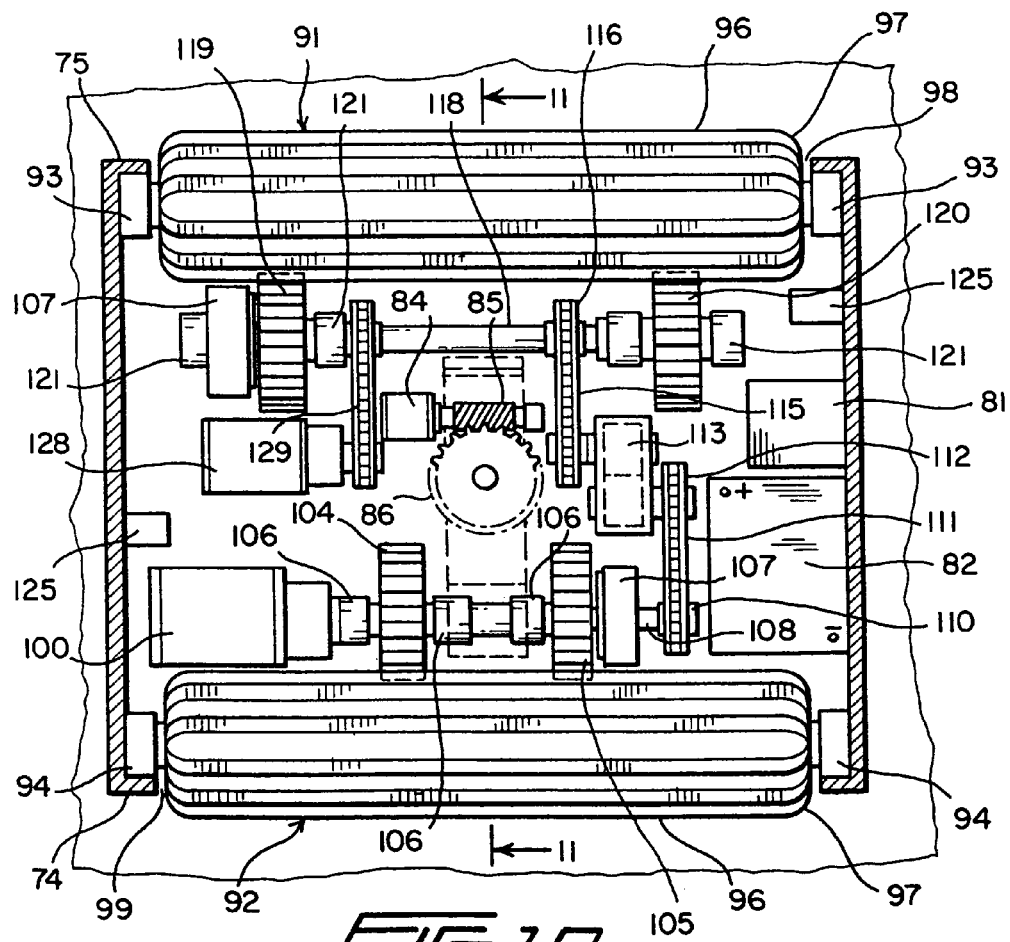
FIG. 10 is a cross-sectional view taken along line 10—10 of FIG. 9.

As previously noted, the load transfer vehicles of the present invention are designed not only for movement across floor or deck surfaces but also include secondary drive elements for allowing the vehicles to power themselves vertically through the hollow trunks. In this respect, and as is shown in FIGS. 9 and 10, the vehicle 32 includes a pair of elongated pinion rollers or rotors 91 and 92 which are rotatably mounted in opposing bearings 93 and 94, respectively, which are provided within the body of the vehicle. The rotors include uniformly spaced elongated teeth 96 which are tapered, as shown at 97, at their ends for purposes of allowing the teeth to align with the racks 50 within each of the open trunks. Each of the pinion rotors extends outwardly through opposing openings 98 and 99 in the sides of the vehicle.

The pinion rotors 91 and 92 are spaced such that when the vehicles enter into one of the trunks, the teeth of the rotors engage with the racks on opposite sides of the trunks thereby providing support for the vehicles as they travel up and down relative to the trunks.

With the present embodiment, the rotors are driven uniformly at the same rate of rotation by a vertical drive motor 100 which is electrically powered by the battery 82, or other source such as an electrical raceway, and which is controlled through the controller 81. The vertical drive motor 100 is connected to two spaced drive gears 104 and 105 which are aligned by bearing collars 106 about a drive shaft 108. The outer end of the drive shaft 108 is connected to a sprocket 110 which drives continuous chain 111 about a sprocket 112 associated with a clutch assembly 113. The clutch assembly 113 is connected at its other end to a secondary continuous chain 115 which is connected to a sprocket 116 mounted to a secondary drive shaft 118. The secondary drive shaft 118 is connected to a pair of drive gears 119 and 120 which are supported by bearing members 121. When the motor 100 is driven, the gears 104 and 105 will rotate pinion rotor 92 whereas gears 119 and 120 will rotate pinion rotor 91. Due to the relationship between the gears and the rotors, the rotors will rotate in opposite directions but in exact timing with respect to one another such that, when they are engaged with the racks of the trunks, the vehicle will move uniformly at each side thereof.

Various reduction gears and brake assemblies may be provided within the second vertical drive circuit shown in FIG. 10. Further, such reduction gears or clutch assembly may include anti-backdrive gears which prevent any force from rotating either of the first or secondary drive shafts unless directly powered by the motor 100. As opposed to using anti-backdrive gears, electro-mechanical brakes such as shown at 107 may be incorporated within the system to control braking as a vehicle ascends and descends within one of the trunks. In some embodiments, more than one motor 100 may be used.

The rechargeable battery 82 is normally designed to be powered through charge ports 125 provided in the vehicle when the vehicle is not in use. It is a unique feature of the present invention that the batteries may also be charged by an on-board generator 128 which is connected by a drive chain 129 to the secondary drive shaft 118. In this manner, part of the energy dissipated during the downward movement of the vehicle within the trunk can be used to generate power to partially recharge the battery for use during horizontal or upward travel. The generator is electrically connected so as to provide electrical power to the battery 82 whenever the vehicle is moving in a descending manner relative to the racks associated with each of the trunks. Thus, the weight of the vehicle can be used as a source of energy supply such that gravity pulling the vehicle downwardly relative to the racks will cause rotation of the drive rotors in a direction opposite to that normally supplied by the motor 100. This counter rotation of the pinion rotors provides energy to the generator 128 thus providing power for generating a source of current for charging the battery 82. When an anti-backdrive gear is utilized, some power must be provided for driving the motor 100 in a reverse direction and thus the anti-backdrive gear arrangement is not preferred if charging of the battery 82 is desired during descending movement of the vehicles relative to the open trunks.

It should be noted that the teeth arrangement described with respect to the pinion rotors is only one manner in which the vehicles may be moved vertically. As opposed to elongated pinion type rotors, enlarged gears and other members having teeth engageable with compatible trunk components may also be used to permit vertical drive.

Each of the load transfer or transport vehicles 32 which is designed to move within the open trunks further includes a third drive assembly for initially pulling the vehicles into the trunks by cooperative engagement with the horizontal racks previously described or discharging the vehicles from the trunks. The third drive elements are shown in drawing FIGS. 11–14 as including horizontal pinions 130 which extend through openings 131 generally adjacent each upper corner of the body of the vehicle and through the opposite sidewalls 74 and 75. As each of the horizontal pinions 130 operates in the same manner, only one of the pinions will be described in detail.

As shown in FIG. 12, the pinion 130 includes a plurality of teeth 132 which mesh with the horizontal racks 65 within the trunks. When entering a trunk, the teeth will also interact with the teeth 68 previously described. The pinion 130 is driven by meshing engagement with a drive gear 133 driven by an electric motor 135. The motor 135 is mounted on an extendible rod or arm 137 which is driven inwardly and outwardly with respect to a motor 138. The connection between the arm 137 and the motor 138 is preferably that of a lead screw such that by activation of the motor in one direction the arm 137 is extended so as to drive the pinion 130 outwardly into engagement with the horizontal rack 65 within the trunk. After a vehicle has exited the trunk, the motor 138 is reversed thereby withdrawing the pinion 130 within the vehicle. Power for both the gear motor 135 and the extension motor 138 is provided by the on-board battery 82 or other source such as an electrical raceway.

Figure 11:
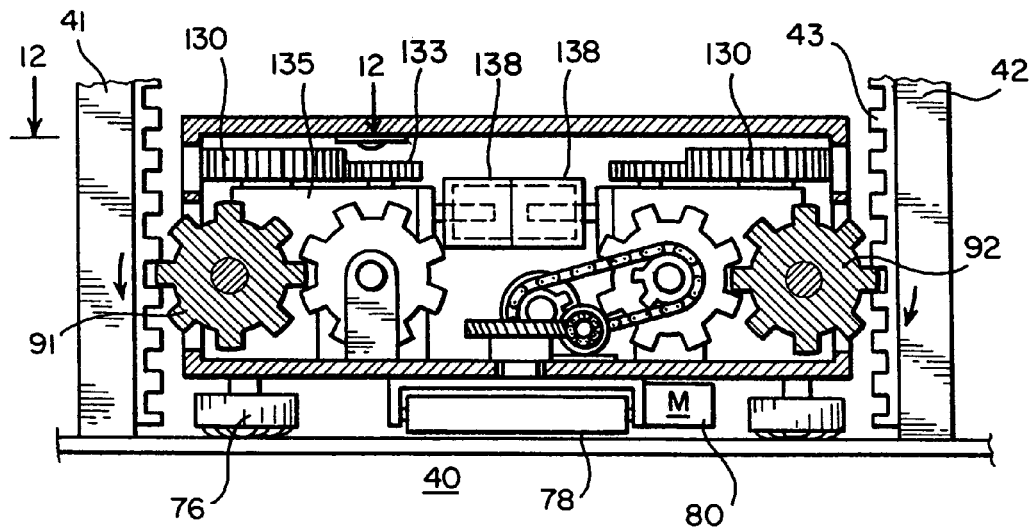
FIG. 11 is a cross-sectional view taken through the vehicle of FIG. 10 and illustrating the manner in which the vehicle is positioned between storage bins in accordance with the teachings of the invention.

With specific reference to FIG. 11, the present embodiment of load transfer vehicle 32 is shown being maneuvered between rows 41 or 42 of storage bins 40 as previously discussed. The vertical supports of opposing storage bins are provided with the vertically extending racks 43 similar to the vertically extending racks 50 described with respect to those in the open trunks, with the exception that the racks 43 are of smaller width. By providing the racks 43 in opposing relationship with one another within the storage bins, the load transfer vehicle 32 can be used to elevate goods within the storage bin area by operation of the vertical drive motor 100 thus causing the pinion rotors 91 and 92 to engage the racks 43 to either elevate or descend the vehicle relative to the storage racks.

As opposed to using the pinion rotors 91 and 92 for creating vertical movement relative to the storage bins, in some embodiments, a scissors lift or other mechanism may be provided within the transfer unit for elevating the upper platform mounted to the vehicle.

Figure 15:
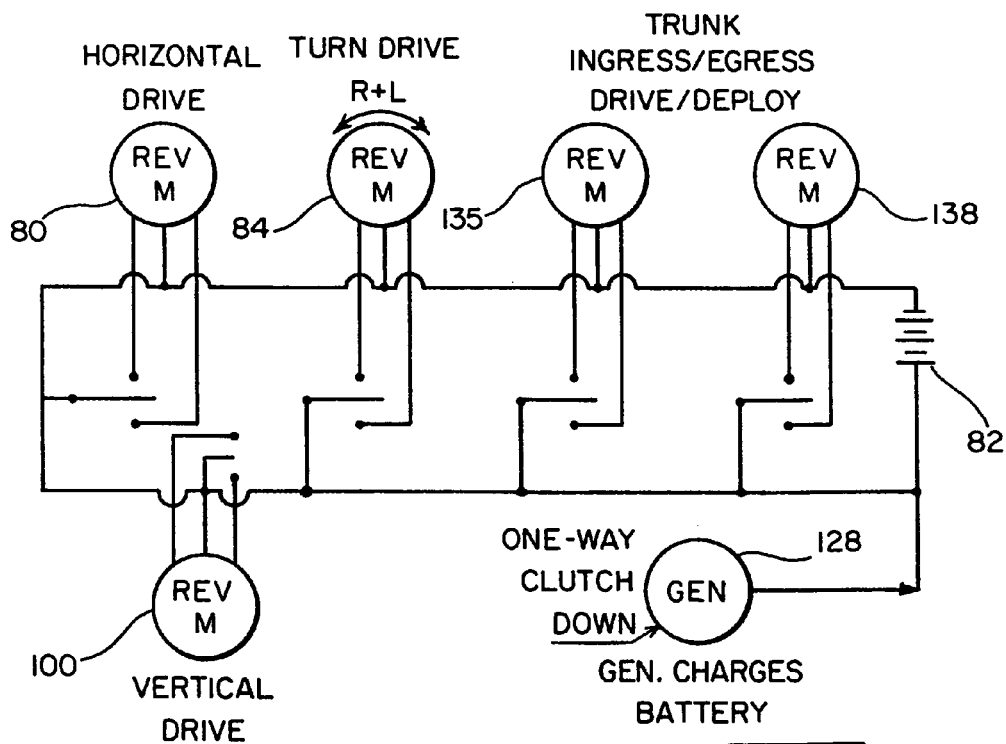
FIG. 15 is a simplified electrical circuit illustrating the manner in which the motors associated with the embodiment of FIGS. 9–14 are connected to power.

With specific reference to FIG. 15, a simplified electrical circuit is disclosed showing the interconnection of the battery 82 and the motors 80, 84, 100, 135 and 138 described with respect with respect to the embodiment of FIGS. 9–11. The schematic diagram also shows the connection of the generator 128.

Figure 16:
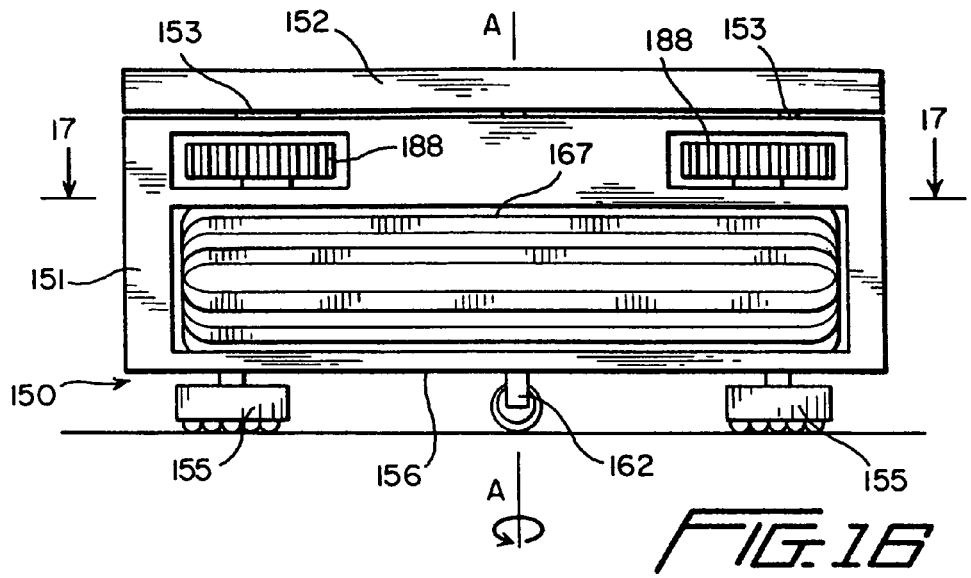
FIG. 16 is a side elevational view of a second embodiment of load transfer vehicle in accordance with the invention.
Figure 17:
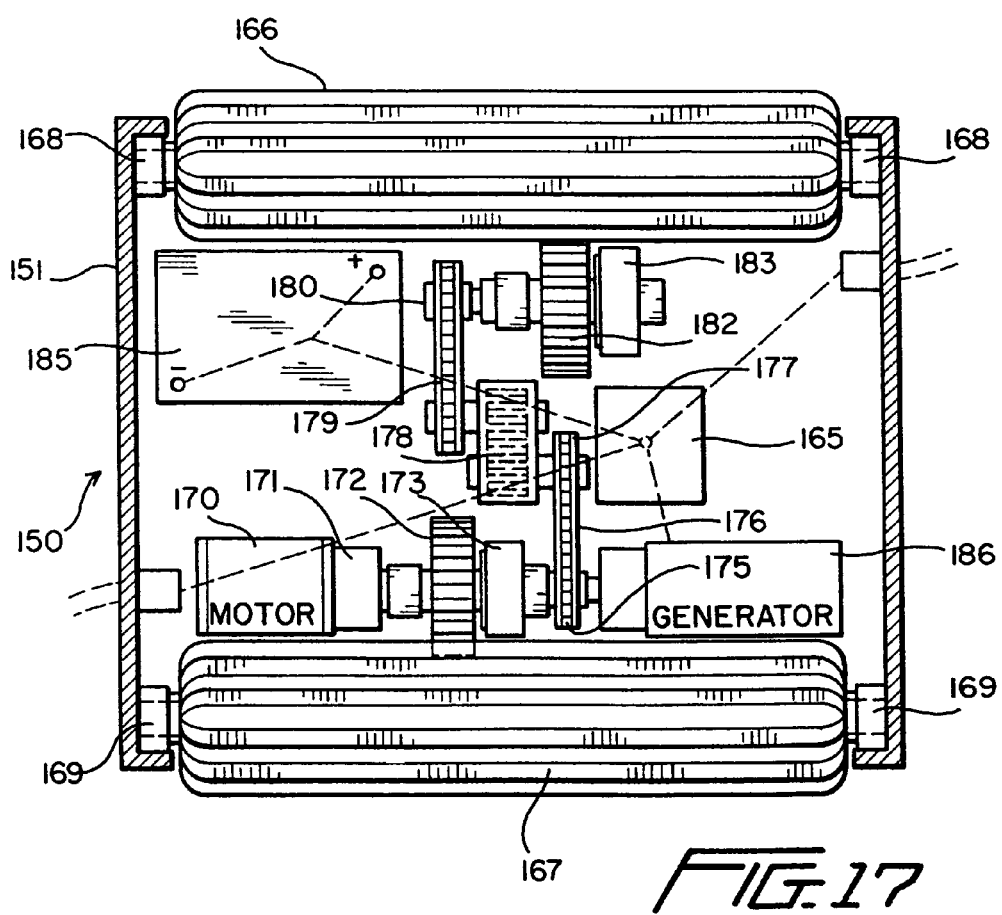
FIG. 17 is a cross-sectional view taken along line 17—17 of FIG. 16.

With specific reference to FIGS. 16–18, another embodiment of load transport vehicle 150 is disclosed. The vehicle is similar to the one previously described with the exception of a pivotal or rotatable load supporting platform and the manner in which the first drive elements for maneuvering the vehicle across the surface and the drive train for powering the pinion rollers.

In this embodiment, the vehicle 150 includes a body 151 to which is rotatably supported an article supporting platform 152. The platform is supported on an annular bearing track 153 and is driven about axis A—A by a suitable motor or power source, not shown. Each of the transfer vehicles of the invention may include a rotatable, shiftable and/or extendible load supporting platform for purposes of facilitating the pick-up or transfer of goods to and from the vehicles.

The vehicle 150 is supported by sets of wheel or roller assemblies 155 which are similar to those previously described and which are provided adjacent the corners of the vehicle and extending from the lower surface 156 thereof. As with the previous embodiment, additional roller sets may be provided.

In the present embodiment, propulsion and omni-directional steering of the vehicle 150 is achieved by a set of wheels or rollers 158 and 159 each of which is powered by a separate electric motor 160 and 161, respectively. The rollers 158 and 159 are generally fixedly secured relative to the lower surface 156 of the vehicle by a bracket assembly 162. Steering of the vehicle is accomplished by relative rotation and reverse rotations of the rollers with respect to one another such that the vehicle may be steered in a 360° manner by controlled operation of the reversible electric motors 160 and 161 which are connected to an interior controller 165 shown in FIG. 17.

The load transfer vehicle 150 further includes a pair of pinion drums or rotors 166 and 167 which are similar to those discussed with respect to the previous embodiment. Each of the pinion rotors are mounted within opposing bearings 168 and 169, respectively. The pinion rotors are driven by a motor 170 carried within the transfer vehicle which has a drive output through clutch 171 for driving a gear wheel 172 which intermeshes with the pinion rotor 167. A brake 173 which may include an anti-backdrive gear is mounted to the drive output and an output shaft therefrom is connected to a drive sprocket 175 which drives a chain 176 which is connected to a second sprocket 177. The sprocket 177 drives an input into a clutch assembly 178. An output from the clutch assembly is used to drive a second drive chain 179 which is connected to a driver sprocket 180 which drives a second drive gear 182 which meshes with the pinion rotor 166. A second brake device 183 is mounted adjacent the second drive gear 182 and may also include an anti-backdrive gear. As both the pinion rotors 166 and 167 are driven by a common motor 170, they rotate at the same rate but in opposite directions.

Also shown in FIG. 17 is a rechargeable battery 185 which is charged using a generator 186 in the manner described with respect to the previous embodiment, whenever the transfer vehicle is descending within one of the trunks of the system.

The transfer vehicle 150 also includes a plurality of horizontal pinion gears 188 which are deployed in the same manner as described with respect to the previous embodiment in order to engage with the horizontal racks found at each level of the open trunks.

Figure 19:
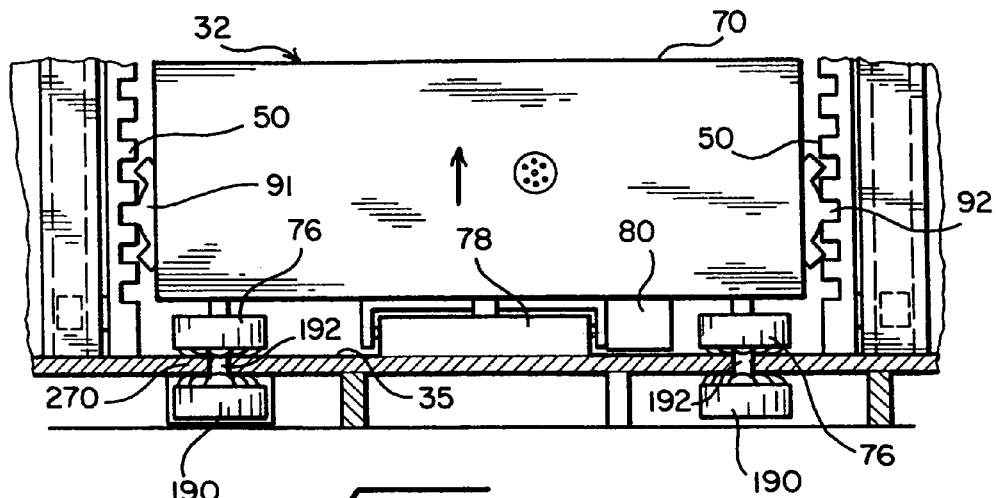
FIG. 19 is a front plan view of load transfer vehicle as shown in FIG. 9 as modified to operate within a channel or track system.
Figure 20:
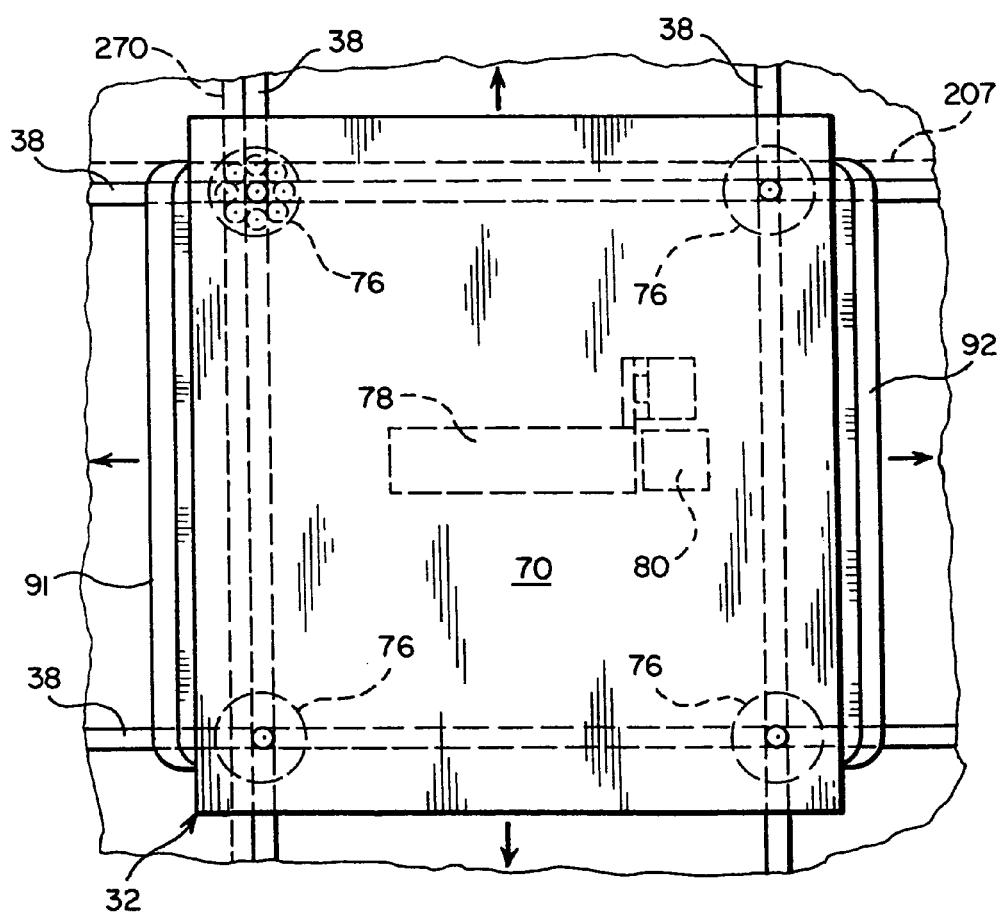
FIG. 20 is a top plan view of the modified load transfer vehicle shown in FIG. 19 shown guided in an open channel or track guidance system.

As previously described with respect to FIG. 1, the systems of the invention may include guide channels, especially in storage room areas, for guiding the load transfer vehicles. In FIG. 1, the guide channels are shown at 38 as being generally linear channels which intersect perpendicularly with respect to one another. With reference to FIGS. 19 and 20, a transfer vehicle 32, as previously described, is shown as entering into one of the trunks from a grid type system. The vehicle is modified in a channel guide system to include secondary roller sets 190 which depend from the primary roller sets 76 associated with the transfer vehicle. The secondary roller sets 190 are connected by struts or posts 192 to the primary rollers sets 76. In the modified version of the invention shown in FIGS. 19 and 20, the transfer vehicle is moved longitudinally relative to the open channels 38 which are formed in the surface of the lower storage level 35. The secondary roller sets 190 are positioned to roll against the lower surface of the deck or floor 35 and thus prevent any possible tilting of the transfer vehicle as it moves throughout the storage area. By manipulation of the drive roller 78, the transfer vehicle can move longitudinally in the direction shown by the four arrows in FIG. 20 along the channels 38. Different configurations or layouts of the channels may also be utilized in accordance with the teachings of the present invention.

Figure 21:
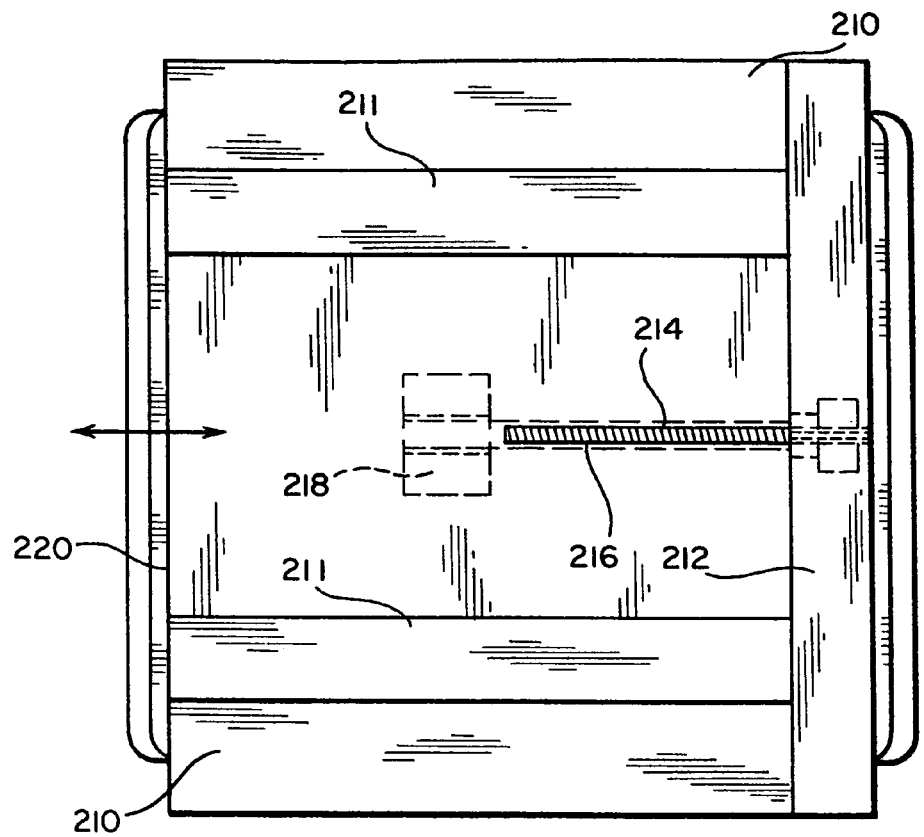
FIG. 21 is a top plan view of a further embodiment of load transfer vehicle in accordance with the teachings of the present invention showing a self-loading and unloading capability.
Figure 22:
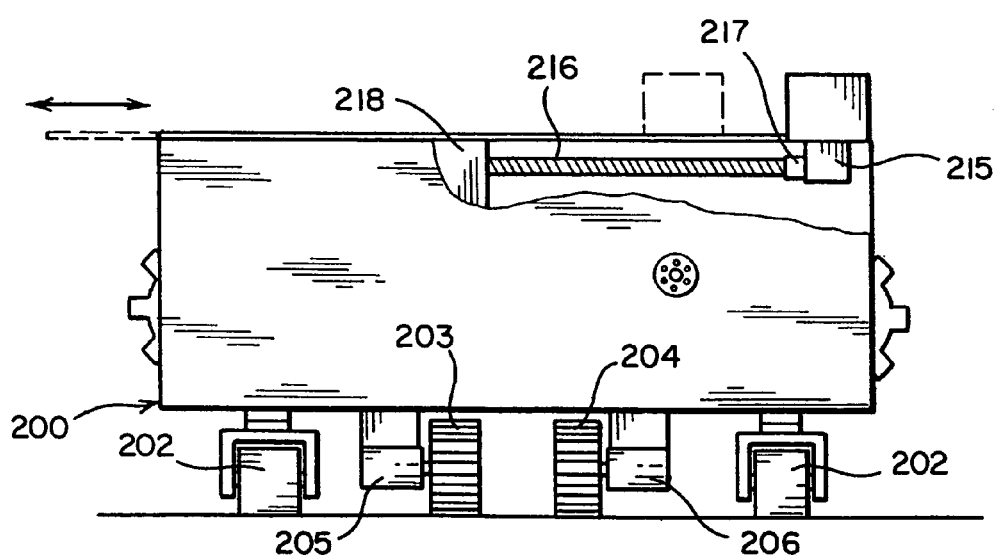
FIG. 22 is a front plan view of the embodiment shown in FIG. 21.

With specific reference to FIGS. 21 and 22, a further embodiment of transfer vehicle 200 is shown. The transfer vehicle 200 is essentially the same as the vehicle 150 described with respect to FIGS. 16–18. However, as opposed to using the roller sets 155 the present embodiment incorporates heavy duty roller or caster wheels 202 at each of the corners of the vehicle for supporting the vehicle relative to a travel surface. Also, propulsion across surfaces is performed utilizing a pair of continuous tracks 203 and 204 which are independently driven by separate motors 205 and 206, respectively, such that the tracks may be driven in reverse directions with respect to one another. The motors 205 and 206 may be reversible electric motors which are powered by the power supply carried within the vehicle or electrical raceway. In this manner, the vehicle is omni-directional being able to move in substantially 360°. The tracks are preferably formed of a material such as rubber which provides sufficient frictional traction to prevent any sliding or slipping of the vehicle relative to a travel surface, including along metallic flooring. The tracks may be enlarged and separated at a greater distance from one another so as to do away with the rollers or wheels 202.

The vehicle 200, has also been modified, however, to provide for a self-loading and off-loading capability. In the present embodiment, a load discharging and charging mechanism is provided which enables the vehicle to both discharge a load placed thereon as well as to load goods which are placed within the storage bins of the system. To accomplish this, a pair of undercut channels (not shown) are provided in spaced relationship along the upper surface 210 of the vehicle. A pair of spaced load supporting arms 211 are slidably disposed within the channels and are connected at one end to a vertically extending header 212 which interconnects the arms together. The header is slidably movable with the arms over the upper surface 210 of the vehicle. An elongated open slot 214 is provided through the upper surface 210 in which is guidingly received a depending tongue 215 which is rigidly secured to the header 212. The tongue 215 is also connected to an extendible and retractable member such as a lead screw 216 which is connected by way of a rotatable bearing 217 to the tongue 215 and to an electric motor 218. By operating the electric motor to rotate in reversible directions, the lead screw can be moved so as to deploy the load supporting forks 211 and 212 by pulling the header 212 toward the front end 220 of the vehicle. In this manner, a load can be discharged from the vehicle into a storage bin. In a like manner, the forks may be extended so as to engage goods supported on a pallet and thereafter, by reversing the lead screw, the forks carrying the pallet will slide back into a transport position, as shown in FIG. 21.

To facilitate the discharge or self-loading of pallets, and as shown in FIG. 22, the upper surface of the support forks 211 and 212 is spaced slightly above the upper surface 210 of the vehicle. The upper surface of the forks may also be treated such as with a textured material or rubber layer to provide frictional force for prohibiting any undesired sliding movement of any pallet engaged by the forks.

The self-loading and off-loading feature described may be achieved by other types of mechanical elements. Further, such devices may be incorporated within all of the embodiments of the invention disclosed herein.

With reference to FIGS. 23–31, another embodiment of the invention is disclosed in greater detail. In this embodiment, the load transport vehicle has a main body which is substantially similar to that of the first described embodiment shown at 32 in the drawing figures. In this respect, the vehicle includes first primary drive elements for propelling the vehicle across a level or deck surface, a second pair of rotatable pinion rotors for maneuvering the vehicle within one of the trunks of the system and pairs of outwardly deployable horizontal pinions for cooperating with the horizontal racks provided at each of the access openings into the trunks of the system. The load transfer vehicle 230 is provided with a forklift mast 231 on which a pair of generally L-shaped forks 232 are mounted so as to vertically adjustable.

Figure 23:
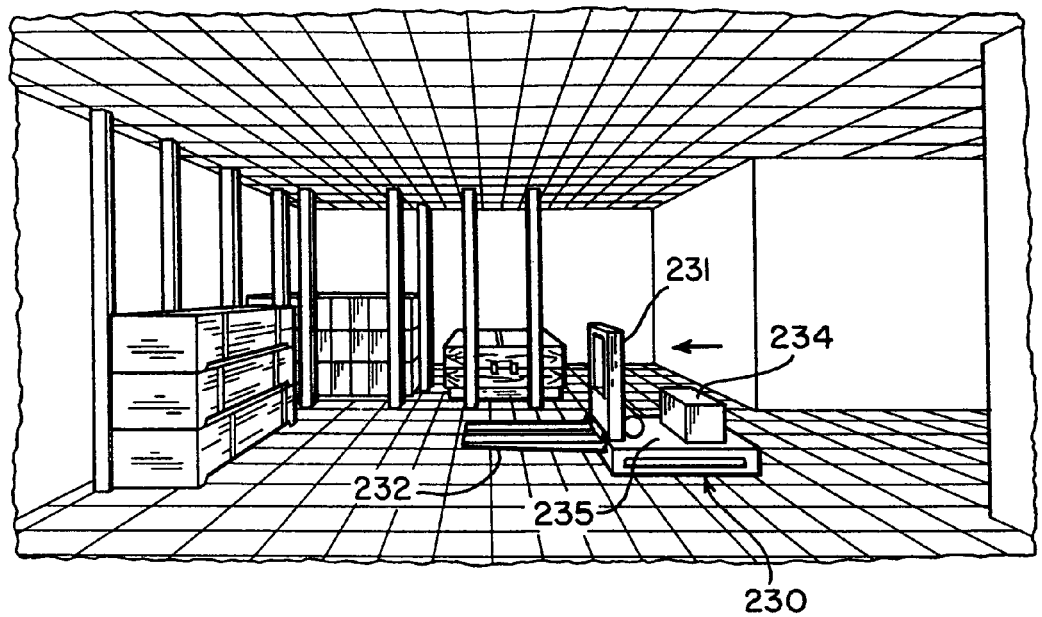
FIG. 23 is an illustrational view of a storage area in accordance with the teachings of the present invention showing a further embodiment of load transfer vehicle.
Figure 24:
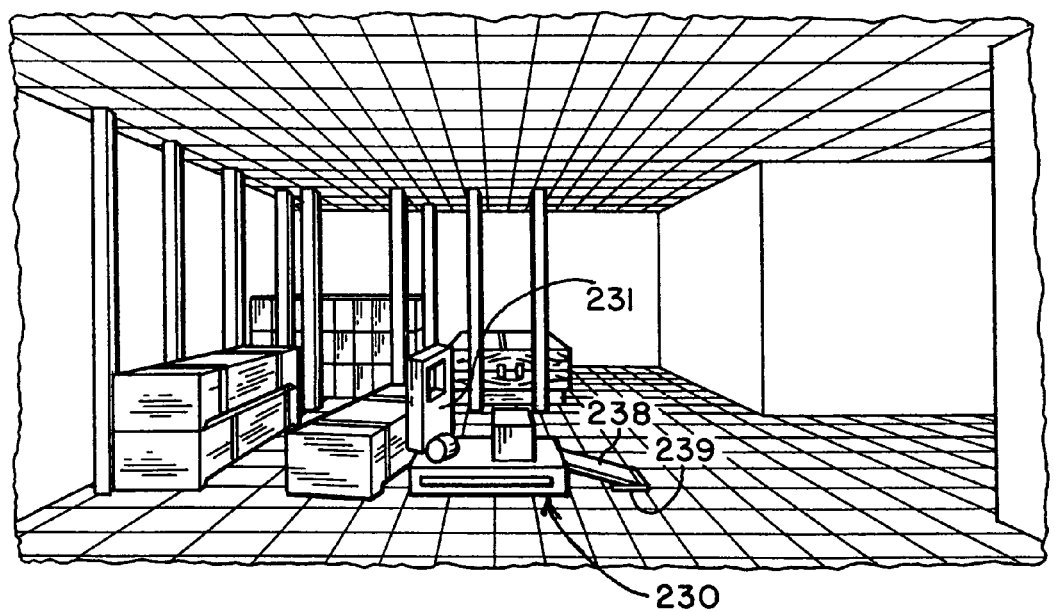
FIG. 24 is an illustrational view of the vehicle and storage system shown in FIG. 23 showing the vehicle lifting a load and deploying a counter-balance outrigger.
Figure 25:
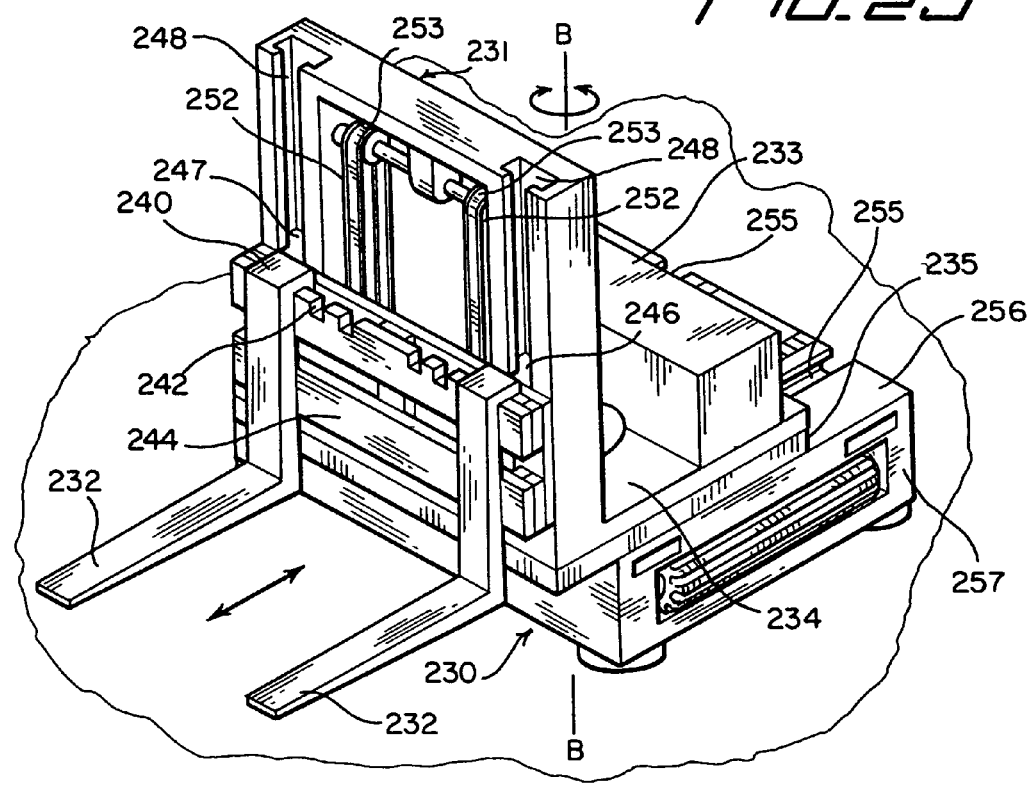
FIG. 25 is a front perspective view of the embodiment of FIG. 23.
Figure 26:
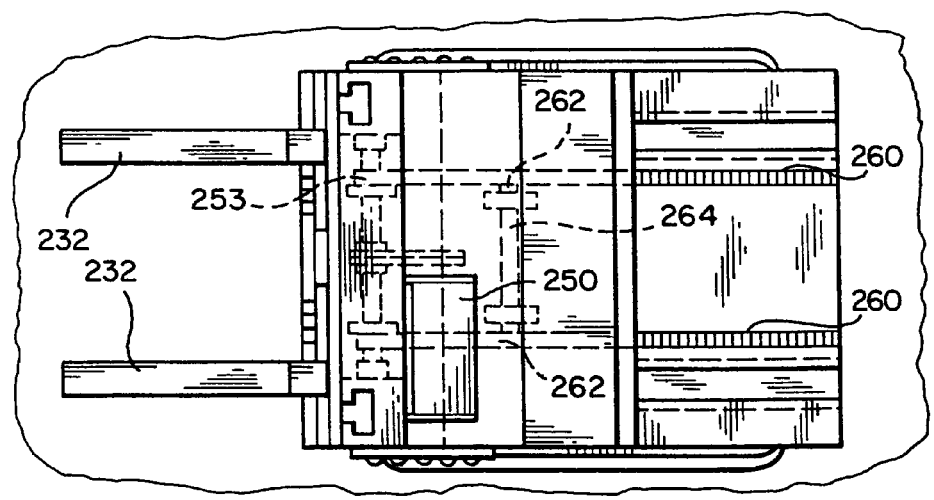
FIG. 26 is a top plan view of the embodiment of FIG. 23.

In FIGS. 23 and 24, the load transfer vehicle 230 is shown in a storage area similar to that shown at 35 in FIG. 1. The vehicle may be movable within a track system as described with respect to the embodiments in FIGS. 19 and 20 or may be freely movable with respect to the supporting surfaces.

Due to the additional energy requirement, in the present invention, an enlarged battery pack and control assembly 233 are mounted at the rear of a pivotable upper platform 234 of the vehicle. The platform is carried by and is pivotal relative to a slide platform 235 which is movable with respect to the main body of the vehicle. The platform 233 is pivotable about vertical axis B—B of the vehicle in a 360° motion relative to the slide platform 234 by way of a power assembly, not shown.

The forklift transport vehicle 230 is shown in the drawing figures as also including an extendible counter balance outrigger 238 at the rear thereof having a foot for engagement with a surface as shown at 239. The foot 239 may include an electro-magnetic member for anchoring to a metallic floor such that magnetic attraction can be selectively applied through appropriate controls (not shown). When not in use, the outrigger may be pivoted or retracted relative to the body of the vehicle, as is shown in FIG. 23. When a heavy load is to be lifted, the outrigger is deployed as shown in FIG. 24 as a counter-balance.

The load lifting forks 232 have upper hooked ends 240 which are engageable within open slots 242 formed in a slide carriage 244 which is slidably keyed at 246 and 247 into spaced channels 248 adjacent opposites of the mast 231. A drive motor 250 is drivingly engaged with a pair of continuous chains 252 which are movable about spaced sprocket assemblies such as shown at 253 so as to raise and lower the carriage 244 to which the forks are removably mounted.

The slidably platform 235 of the load transfer vehicle 230 is guided within a pair of channels 255 which are provided in an upper wall 256 of the main body 257 of the vehicle. A pair of linear gear racks 260 are provided in spaced relationship adjacent to the channels 255 along the upper surface 256 of the body 257 and cooperate with drive gears 262 carried by the platform. The pair of drive gears for moving the platform are connected to a common shaft 264 and are driven by an electric motor, not shown, through a drive gear, not shown.

In this embodiment, if it is desired to move the transport vehicle into the trunks, the sliding platform is reversed so as to draw the forks in overlying relationship with respect to the body of the vehicle. Further, the platform can easily be removed from the body of the vehicle allowing the vehicle to be used in a manner as described with respect to the other embodiments of the invention.

As previously noted, in some embodiments, electrical power may be supplied to one or more of the transfer vehicles such as by electrical raceways or rails which would be distributed in a guide grid system. By way of example, and with reference to FIGS. 19 and 20, an electrical raceway or rail 270 is shown as extending along the flanged surfaces defining a number of the guide channels 38. An electrical wiper or contact, not shown, carried by one of the secondary roller sets 190 conduit power from the electrified raceway or rail 270 to on-board equipment, pumps and motors as well as to batteries for charging purposes. Similar electrical raceways could also be provided within the trunks 33 and 34. In this manner the vehicles may receive power in a manner conventionally practiced in some electrical railway systems.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. An automated material transfer and storage system for moving articles along and between a plurality of vertically spaced horizontal levels, the system comprising:
    at least one vertical trunk extending between and communicating the plurality of horizontal levels, said at least one trunk defining an open shaft including ingress/egress openings at said plurality of horizontal levels and having opposite sides oriented, and vertically spaced first rack elements extending vertically within said at least one vertical trunk in offset relationship relative to said ingress/egress openings so as to be spaced in non-interfering relationship relative to said ingress/egress openings;
    a load transfer vehicle having an article support surface, at least one first drive means for moving said transfer vehicle horizontally across the plurality of horizontal levels, at least one second rotatable drive means having a plurality of teeth which are directly engageable so as to mesh with said first rack elements for moving said transfer vehicle vertically within said at least one vertical trunk, and at least one third drive means for automatically loading and off-loading said transfer vehicle onto said first rack elements;
    means for supplying power to said transfer vehicle and connected to said at least one first, second and third drive means; and
    control means carried by said transfer vehicle for controlling said at least one first, second and third drive means so as to maneuver said transfer vehicle along said plurality of horizontal levels and within said at least one trunk whereby an article supported on said transfer vehicle can be automatically transported from point-to-point along and between said plurality of horizontal levels and within said at least one vertical trunk.

2. The automated material transfer and storage system of claim 1 wherein said means for supplying power includes at least one battery carried by said transfer vehicle.

3. The automated material transfer and storage system of claim 1 wherein said means for supplying power includes an electrical raceway system.

4. The automated material transfer and storage system of claim 1 wherein said first drive means includes at least one drive wheel means pivotally mounted to said transfer vehicle and connected to said means for supplying power to drive said at least one drive wheel means and steering means for selectively rotating said at least one drive wheel means such that said transfer vehicle can be maneuvered omni-directionally relative to said plurality of horizontal levels.

5. The automated material transfer and storage system of claim 4 including a plurality of omni-directional roller means mounted to said transfer vehicle for supporting said transfer vehicle on said plurality of horizontal levels.

6. The automated material transfer and storage system of claim 1 wherein said first drive means includes at least one pair of drive elements, and said means for supplying power includes means for driving said at least one pair of drive wheel elements such that said drive wheel elements are independently operable in opposite directions whereby said transfer vehicle can be maneuvered omni-directionally relative to said plurality of horizontal levels.

7. The automated material transfer and storage system of claim 6 including a plurality of omni-directional roller means mounted to said transfer vehicle for supporting said transfer vehicle on said plurality of horizontal levels.

8. The automated material transfer and storage systems of claim 1 including opposing vertically spaced first rack elements extending vertically along said opposite sides of said at least one trunk, said second rotatable drive means including a pair of elongated drive rotors extending outwardly from opposite sides of said transfer vehicle, each of said drive rotors having a plurality of equally spaced teeth extending generally parallel to an elongated central axis thereof, said teeth of said drive rotors being cooperatively engaged with vertically spaced teeth extending from said opposing first rack elements, and means for supplying powering including means for causing each of said drive rotors to be uniformly driven in oppositely rotating directions.

9. The automated material transfer and storage system of claim 8 including an electrical generator carried by said transfer vehicle and being operatively connected to said drive rotors to generate electrical energy when said transfer vehicle moves downwardly within said at least one trunk, and said means for supplying power including at least one battery carried by said transfer vehicle which is operatively connected to said generator for receiving charging power therefrom.

10. The automated material transfer and storage system of claim 8 including brake means for operatively retaining the said transfer vehicle in a fixed position within said at least one trunk, said brake means being operative in response to loss of electrical power from said means for supplying power.

11. The automated material transfer and storage system of claim 8 including second rack elements extending horizontally within said at least one trunk from each of said ingress/egress openings, said second rack elements including a plurality of equally spaced teeth, said at least one third drive means including drive members extending from said opposite sides of said transfer vehicle, each of said drive members including teeth for intermeshing with said teeth of said second rack elements, and means for powering said drive members on opposite sides of said transfer vehicle in uniform rotational velocity and in opposite directions.

12. The automated material transfer and storage system of claim 11 including deployment means carried by said transfer vehicle for selectively deploying said drive members from a first position within said transfer vehicle to a second position extending from said opposite sides of said transfer vehicle to engage said second rack elements.

13. The automated material transfer and storage systems of claim 1 wherein said second drive means includes a pair of elongated drive rotors extending outwardly from opposite sides of said transfer vehicle, each of said drive rotors having a plurality of equally spaced teeth extending generally parallel to an elongated central axis thereof, said teeth of said drive rotors being cooperatively engaged with vertically spaced teeth extending from said opposing first rack elements, and said means for supplying powering including means for causing each of said drive rotors to be uniformly driven in oppositely rotating directions.

14. The automated material transfer and storage system of claim 13 including an electrical generator carried by said transfer vehicle and being operatively connected to said drive rotors to generate electrical energy when said transfer vehicle moves downwardly within said at least one trunk, and said means for supplying power including at least one battery carried by said transfer vehicle which is operatively connected to said generator for receiving charging power therefrom.

15. The automated material transfer and storage system of claim 14 including brake means for operatively retaining the said transfer vehicle in a fixed position within said at least one trunk, said brake means being operative in response to loss of electrical power from said means for supplying power.

16. The automated material transfer and storage system of claim 1 including a plurality of horizontally and vertically spaced storage bins within at least one of said vertically spaced horizontal levels, additional vertical racks provided on vertical faces of said storage bins, said additional vertical racks having teeth in which said plurality of teeth of said at least one second rotatable drive means are directly engageable so as to move said transfer vehicle vertically relative to said storage bins.

17. The automated material transfer and storage system of claim 1 including second rack elements extending horizontally within said at least one trunk from each of said ingress/egress openings, said second rack elements including a plurality of equally spaced teeth, said at least one third drive means including drive members extending from said opposite sides of said transfer vehicle, each of said drive members including teeth for intermeshing with said teeth of said second rack elements, and means for powering said drive members on opposite side of said transfer vehicle in uniform rotational velocity and in opposite directions.

18. The automated material transfer and storage system of claim 1 including article handling means carried by said transfer vehicle for automatically loading and off-loading articles onto said transfer vehicle.

19. The automated material transfer and storage system of claim 18 wherein said article handling means includes lift means for selectively elevating and extending articles relative to said article support surface of said transfer vehicle.

20. The automated material transfer and storage system of claim 19 wherein said lift means includes fork lift arms which are guidingly carried by a lift tower which is moveably mounted to said article support surface of said transfer vehicle.

21. The automated material transfer and storage system of claim 19 including stabilization means carried by said transfer vehicle for selectively engaging one of said plurality of levels to prevent tilting of said transfer vehicle when an article is extended on said lift means from said transfer vehicle.

22. The automated material transfer and storage system of claim 1 including a cover member for covering an upper end of said at least one trunk, said cover member being moveable from a first position to permit access to said at least one trunk to a second position to close said upper end of said at least one trunk and means for normally retaining said cover member in said second position.

23. The automated material transfer and storage system of claim 22 wherein said upper end of said at least one trunk is positioned at an uppermost one of said plurality of horizontal levels, and means carried by said cover means for permitting said transfer vehicle to ingress/egress at said upper end of said at least one trunk relative to said uppermost level.

24. The automated material transfer and storage system of claim 23 wherein said cover member includes a pair of doors having upper surfaces which are co-extensive with said uppermost level when in said second position, means for pivotally mounting said doors relative to said uppermost level, and supplemental first and second rack elements provided on a lower surface of said doors such that said supplemental first rack elements are aligned with said first rack elements of said at least one trunk when said doors are in said first position.

25. The automated material transfer and storage system of claim 1 wherein said article support surface of said load transfer vehicle includes a rotatable platform.

26. The automated material transfer and storage system of claim 1 wherein said control means includes means for receiving and transmitting information relative to a central control system remote from said load transfer vehicle with respect to storage locations of articles and distribution destinations of articles within the system.

27. The automated material transfer and storage system of claim 26 wherein said control means includes means for receiving information which is applied to an article within the system.

28. The automated material transfer and storage system of claim 27 wherein said control means includes an on-board guidance system including means for communicating with a remote guidance source.

29. The automated material transfer and storage system of claim 26 including a plurality of load transfer vehicles.

30. A load transfer vehicle for distributing articles with respect to a plurality of vertically spaced horizontal levels which levels are communicated by at least one vertical trunk which defines an open shaft including ingress and egress openings at said plurality of horizontal levels and having first rack elements extending vertically within the open shaft, the load transfer vehicle comprising;
a body including an article support surface, at least one first drive means for mobilizing said transfer vehicle horizontally across the plurality of horizontal levels and at least one second rotatable drive means having teeth which are directly engageable with said first rack elements for moving the transfer vehicle vertically within the at least one vertical trunk;
at least one third drive means for automatically loading and off-loading the transfer vehicle relative to the first rack elements within the at least one trunk;
means for supplying power to said at least one first, second, and third drive means; and
control means carried by said transfer vehicle for controlling said at least one first, second and third drive means so as to maneuver the transfer vehicle along the plurality of horizontal levels and within the at least one trunk whereby an article supported on said article support surface can be transported from point-to-point along and between the plurality of horizontal levels and within the at least one trunk.

31. The load transfer vehicle of claim 30 in which said means for supplying power includes at least one battery carried by the vehicle, and means associated with said at least our second rotatable drive means to recharge said at least one battery.

32. The load transfer vehicle of claim 30 wherein said at least one first drive means includes omni-directional driving members for supporting said body and for moving the load transfer vehicle across the plurality of levels.

33. The load transfer vehicle of claim 30 in which said at least one second drive means includes a pair of oppositely oriented rotating drive elements extending from opposite sides of said body, said drive elements including a plurality of generally equally spaced teeth, means for rotating said drive elements in uniform rotational velocity and in opposite directions, and said teeth being spaced so as to cooperatively meshed with teeth associated with the first rack elements.

34. The load transfer vehicle of claim 30 in which the at least one third drive means includes rotating members extending from said opposite sides of said body of the transfer vehicle, each of said rotating members including teeth for intermeshing with teeth of second horizontal rack elements provided within the at least one vertical trunk, and means for powering said rotating members in uniform rotational velocity and in opposite directions.

35. The load transfer vehicle of claim 30 including means carried by said body for automatically loading and discharging articles from said article support surface.

36. The load transfer vehicle of claim 30 including an automated guidance system carried by said body.

37. The load transfer vehicle of claim 30 including means for reorienting said article support surface.

38. The load transfer vehicle of claim 30 including anchor means deployable relative to said body for securing said body relative to one of the plurality of levels.

39. The load transfer vehicle of claim 30 including means carried by said body for electrically communicating with coded devices carried by an article to be transferred on the transfer vehicle.

* * * * *